(12) United States Patent
Kim et al.

(10) Patent No.: US 12,546,696 B2
(45) Date of Patent: Feb. 10, 2026

(54) FLOW CELL AND FLOW NANOPARTICLE MEASUREMENT DEVICE AND MEASUREMENT METHOD INCLUDING THE SAME

(71) Applicant: DONGWOO FINE-CHEM CO., LTD., Jeollabuk-do (KR)

(72) Inventors: Young Hoon Kim, Gyeonggi-do (KR); Su Yeon Oh, Gyeonggi-do (KR); Jeong Min Choi, Gyeonggi-do (KR); Seung Pil Han, Jeollabuk-do (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 1149 days.

(21) Appl. No.: 17/506,068

(22) Filed: Oct. 20, 2021

(65) Prior Publication Data

US 2022/0120659 A1    Apr. 21, 2022

(30) Foreign Application Priority Data

Oct. 20, 2020 (KR) .................. 10-2020-0136219

(51) Int. Cl.
*G01N 15/1404* (2024.01)
*G01N 15/1434* (2024.01)
*G01N 21/64* (2006.01)
*G01N 15/14* (2006.01)

(52) U.S. Cl.
CPC ..... *G01N 15/1404* (2013.01); *G01N 15/1436* (2013.01); *G01N 21/6454* (2013.01); *G01N 2015/1493* (2013.01); *G01N 2201/06113* (2013.01)

(58) Field of Classification Search
CPC ........... G01N 15/1404; G01N 15/1436; G01N 21/6454
See application file for complete search history.

(56) References Cited

U.S. PATENT DOCUMENTS 5,316,983 A    5/1994    Fujimori et al.

FOREIGN PATENT DOCUMENTS

| CN | 108603825 | A | | 9/2018 | | |
|---|---|---|---|---|---|---|
| GB | 2573890 | A | * | 11/2019 | ............ | G01N 21/05 |
| JP | H2-184739 | A | | 7/1990 | | |
| JP | H03-239950 | A | | 10/1991 | | |
| JP | H4-93637 | A | | 3/1992 | | |
| JP | H4-110638 | A | | 4/1992 | | |
| JP | H5-10868 | A | | 1/1993 | | |
| JP | H06-323982 | A | | 11/1994 | | |
| JP | H08-10188 | B2 | | 1/1996 | | |
| JP | 2000-002648 | A | | 1/2000 | | |
| JP | 2013-032982 | A | | 2/2013 | | |
| JP | 2013-238420 | A | | 11/2013 | | |
| KR | 10-2010-0040457 | A | | 4/2010 | | |
| KR | 10-2142248 | B1 | | 8/2020 | | |
| WO | WO-02063284 | A2 | * | 8/2002 | ............ | G01N 21/85 |

OTHER PUBLICATIONS

Office action issued on Oct. 4, 2022 from Japan Intellectual Property Office in a counterpart Japanese Patent Application No. 2021-171132 (all the cited references are listed in this IDS.) (English translation is also submitted herewith.).

Notice of Allowance issued on Mar. 7, 2023 from Japan Intellectual Property Office in a counterpart Japanese Patent Application No. 2021-171132 (all the cited references are listed in this IDS.) (English translation is also submitted herewith.).

* cited by examiner

*Primary Examiner* — Randy Boyer
(74) *Attorney, Agent, or Firm* — The PL Law Group, PLLC

(57) ABSTRACT

A flow cell according to an embodiment of the present disclosure includes a main flow portion configured to extend from one end in one direction and lead to other end, a pulsed laser beam being irradiated to the main flow portion, the main flow portion including a flow space in which a liquid sample flows; an inlet guide portion connected to the main flow portion in a different direction from the one direction and configured to guide an introduction of the liquid sample into the main flow portion; and an outlet guide portion connected to the main flow portion in a different direction from the one direction and configured to guide a discharge of the liquid sample from the main flow portion.

13 Claims, 12 Drawing Sheets

FLOW CELL AND FLOW NANOPARTICLE MEASUREMENT DEVICE AND MEASUREMENT METHOD INCLUDING THE SAME

CROSS REFERENCE TO RELATED APPLICATIONS AND CLAIM OF PRIORITY

This application claims the priority benefit of Korean Patent Application No. 10-2020-0136219 filed on Oct. 20, 2020, which is incorporated herein by reference for all purposes as if fully set forth herein.

BACKGROUND

1. Technical Field

The present disclosure relates to a flow cell and a flow nanoparticle measurement device including the same. More specifically, the present disclosure relates to a measurement device for measuring a tiny amount of nanoparticles existing in a sample with flow.

The present disclosure relates to a highly sensitive detection method capable of detecting a sample with a low concentration of ppt level of 100 nm or less when analyzing a high-purity chemical, such as a liquid chemical, i.e., a solvent, in a state with flow rate. The present disclosure relates to a measurement device that collects and analyzes signals generated by generating an induced plasma from nano-sized particles by a light source with specific energy.

2. Background Art

Various organic and inorganic chemicals used in a manufacturing process of products requiring high precision, such as displays and semiconductors, require higher purity chemicals than the present in order to prevent a reduction in manufacturing yield, and high-level analysis techniques have been developed and newly applied in order to check the quality of high purity chemicals. Among them, the importance of particle analysis is gradually increasing. Because even small particles of 10-nanometer level may affect the yield reduction and high integration of the semiconductor manufacturing process, the development of a stable analysis method for quality control is required, and the scalability of the technology must also be ensured so that it is possible to analyze even the causes of defects that may occur in the manufacturing process.

In general, a substance that is uniformly dispersed in a liquid in a molecular or ionic state is called a solution. A state in which minute particles, which are larger than normal molecules or ions and have a diameter of about 1 nm to 1000 nm, are dispersed in such a solution without aggregation or precipitation is called a colloidal state, and those in the colloidal state are called colloid.

Research on microcolloids present in the solution is focused on obtaining information on the physical and chemical properties of a substance to be analyzed or improving the detection power of a separation analyzer. The analysis of colloidal particles until recently has a limit of 100 nm in size, and there is a need to develop the technology in that a high concentration sample is required for accurate analysis of colloidal particles of 100 nm or less.

A method of measuring colloidal nanoparticles generally uses a light scattering analysis method for checking the size of a particle using light scattering intensity. However, when fine nanoparticles less than 100 nm in size are measured, the probability of detection at a low concentration rapidly decreases even if scattering light is generated, and thus it is difficult to obtain a reliable result. Further, there is a limit that the concentration of particles has to be parts per million (ppm) or more. The light scattering intensity increases as the particle size increases, whereas the light scattering area decreases as the particle size decreases. Therefore, it is difficult to measure the particle size due to a reduction in the light scattering intensity. Since a relatively large number of particles have to be able to contribute to scattering, the sensitivity is greatly reduced at a concentration less than ppm.

SUMMARY

One aspect of the present disclosure provides a flow cell and a flow nanoparticle measurement device including the same capable of detecting particles with a part per trillion (PPT) concentration of 100 nm or less.

Another aspect of the present disclosure provides a flow cell and a flow nanoparticle measurement device including the same for improving measurement reliability for the measurement of nanoparticles.

Another aspect of the present disclosure provides a flow cell and a flow nanoparticle measurement device including the same that use a cell with a shape designed so that it can be detected in a sample with flow, and include a flow controller consisting of a piston pump and a magnetic valve so that the flow can be controlled without eddy, unlike a general nanoparticle analysis method.

In order to achieve the above-described and other objects of the present disclosure, in one aspect of the present disclosure, there is provided a flow cell including a main flow portion formed to extend from one end in one direction and lead to other end, a pulsed laser beam being irradiated to the main flow portion, the main flow portion including a flow space in which a liquid sample flows; an inlet guide portion connected to the main flow portion in a different direction from the one direction and configured to guide an introduction of the liquid sample into the main flow portion; and an outlet guide portion connected to the main flow portion in a different direction from the one direction and configured to guide a discharge of the liquid sample from the main flow portion.

In another aspect of the present disclosure, there is provided a flow nanoparticle measurement device including a laser generator configured to generate a pulsed laser beam; and a flow cell on which the pulsed laser beam is incident, wherein the flow cell includes a main flow portion formed to extend from one end in one direction and lead to other end, the pulsed laser beam being irradiated to the main flow portion, the main flow portion including a flow space in which a liquid sample flows; an inlet guide portion connected to the main flow portion in a different direction from the one direction and configured to guide an introduction of the liquid sample into the main flow portion; and an outlet guide portion connected to the main flow portion in a different direction from the one direction and configured to guide a discharge of the liquid sample from the main flow portion.

In another aspect of the present disclosure, there is provided a flow nanoparticle measurement method using a flow cell including a main flow portion extending in one direction and an inlet guide portion and an outlet guide portion, each of which is connected to the main flow portion in a different direction from the one direction, the flow nanoparticle measurement method including flowing a liquid sample containing nanoparticles in the main flow portion through the inlet guide portion; irradiating a pulsed laser beam to the main flow portion; and detecting a plasma generated in the main flow portion by the main flow portion and detecting a plasma generated in the main flow portion, wherein the plasma is induced by the pulsed laser beam.

According to one aspect of the present disclosure, the present disclosure can measure nanoparticles of a liquid sample of which a flow is controlled.

According to one aspect of the present disclosure, the present disclosure can reduce a measurement error that may occur when calculating the number of nanoparticles using a measurement value of a very small area in a stationary cell by measuring the nanoparticles in a state where the liquid sample flows, and thus can improve the reliability of nanoparticle measurement.

According to one aspect of the present disclosure, the present disclosure can improve the detection probability of nanoparticles and thus improve the reliability of nanoparticle detection.

An object of the present disclosure is to improve detection power capable of detecting particles of 100 nm or less and a trace amount of samples of a low concentration by controlling a flow rate using a flow control device in order to detect an instantaneously generated signal in plasma detection.

According to one aspect of the present disclosure, the present disclosure can minimize the generation of eddy and the generation of bubbles when a liquid sample flows by improving a structure of a flow portion in which the liquid sample flows.

According to one aspect of the present disclosure, the present disclosure can generate a plasma in a main flow portion and prevent interference due to an inlet guide portion and an outlet guide portion connected to the main flow portion by improving a structure of a flow portion in which the liquid sample flows.

BRIEF DESCRIPTION OF THE DRAWINGS

The accompanying drawings, which are included to provide a further understanding of the disclosure and are incorporated in and constitute a part of the disclosure, illustrate embodiments of the disclosure and together with the description serve to explain the principle of the disclosure.

DETAILED DESCRIPTION

Figure 1:
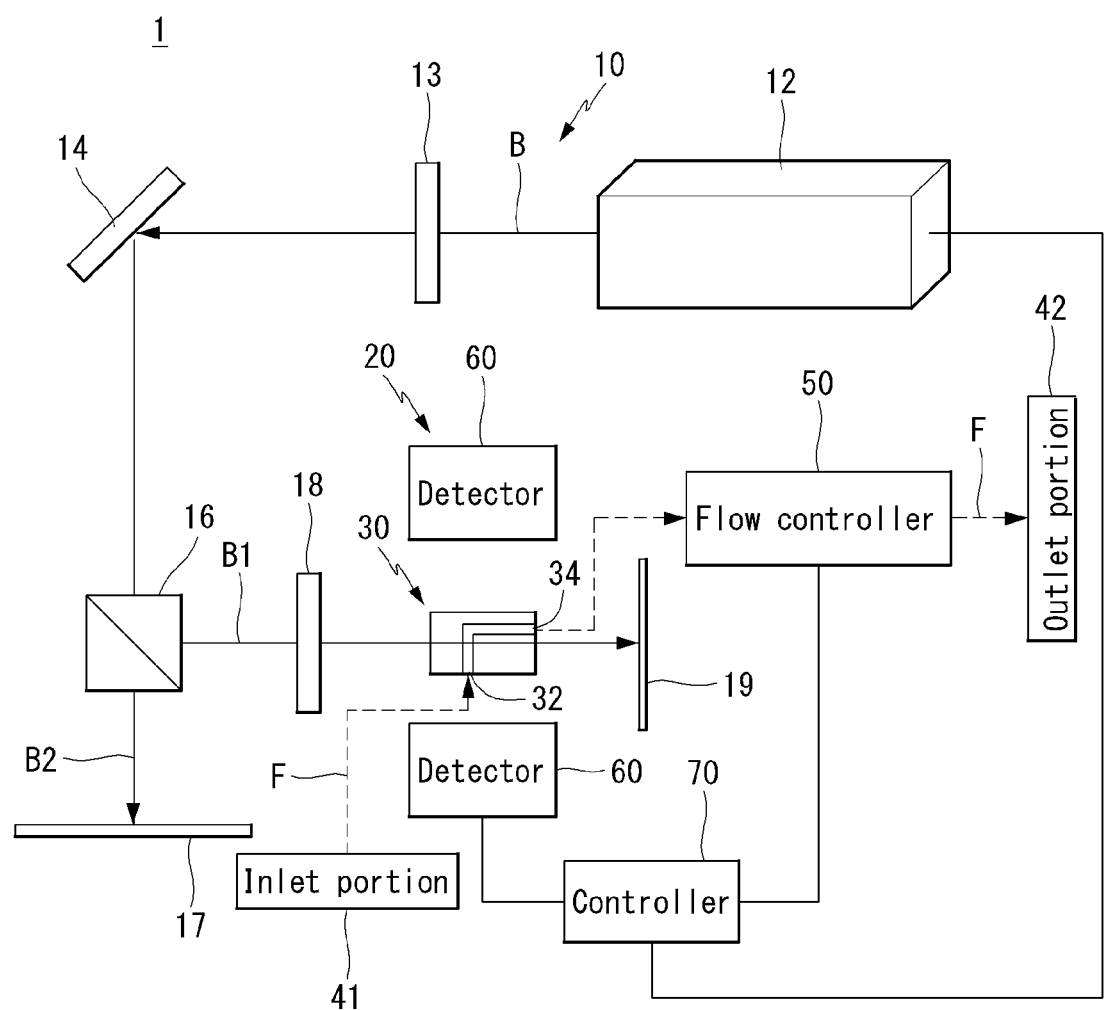
FIG. 1 schematically illustrates a flow nanoparticle measurement device according to an embodiment of the present disclosure.

The detailed description and specific examples such as embodiments of the present disclosure are given merely by way of example, since various changes and modifications within the spirit and scope of the present disclosure will become apparent to those skilled in the art from the detailed description.

Wherever possible, the same reference numbers will be used throughout the drawings to refer to the same or like parts or components.

Terms used in the present disclosure are used to explain embodiments and are not intended to limit and/or restrict the present disclosure. A singular expression can include a plural expression as long as it does not have an apparently different meaning in context. In the present disclosure, terms "include" and "have" should be understood to be intended to designate that illustrated features, numbers, steps, operations, components, parts or combinations thereof are present and not to preclude the existence of one or more different features, numbers, steps, operations, components, parts or combinations thereof, or the possibility of the addition thereof.

The terms including an ordinal number such as "first", "second", etc. may be used to describe various components, but the components are not limited by such terms. The terms are used only for the purpose of distinguishing one component from other components. For example, a first component may be referred to as a second component without departing from the spirit and scope of the present disclosure, and a second component may be referred to as a first component in the same manner. The term "and/or" includes a combination of items related to plurality or some of items related to plurality.

In addition, term such as "part", "device", "block", "member", and "module" may refer to a unit processing at least one function or operation. For example, the terms may mean at least one hardware such as field-programmable gate array (FPGA)/application specific integrated circuit (ASIC), at least one software stored in a memory, or at least one process processed by a processor.

Reference will now be made in detail to embodiments of the disclosure, examples of which are illustrated in the accompanying drawings. The accompanying drawings illustrate embodiments of the present disclosure and are used to help easily understand various technical features, and it should be understood that embodiments presented herein are not limited by the accompanying drawings.

Although the present disclosure may detect light emitted by generating an induced plasma from microparticles using a laser, the present disclosure is described focusing on a method of analyzing shock waves and the size of plasma. This is referred to as a laser-induced breakdown detection (LIBD) technique and is a particle analysis method that can obtain information such as size, concentration, distribution, and composition of nanoparticles by detecting intensity and distribution of an induced plasma generated by focusing a high energy pulsed laser on particles existing in an aqueous solution using various detection methods. Hence, this method has a lower detection limit as the particle size decreases, compared to the existing light scattering method, transmission electron microscope, atomic force microscope, etc. It is reported that this method can theoretically measure up to 1 nano-sized particles, and this method is a nanoparticle analysis method of low concentration where a concentration range is ppt concentration range.

The existing laser-induced breakdown detection method measures shock waves and plasma scintillation generated when an induced plasma is generated. The shock wave is acoustically measured, and the plasma scintillation is measured by attaching a camera near the cell. However, even if plasma is generated by impurities other than nanoparticles of a target to be measured during the measurement of the shock waves and the plasma scintillation, it may be detected and recognized as the shock wave or the scintillation. Alternatively, plasma may be generated again by continuously receiving energy from the generated plasma, and may be detected as a noise.

The present disclosure proposes a method for detecting an induced shock wave generated in a liquid sample with flow using a flow rate control device, and quantifying it to classify the sizes. When the size of nanoparticles for the sample with flow is determined using the control device, the present disclosure can achieve a higher detection limit than the existing detection and non-contact real-time measurement by measuring a range of a specific area, and can obtain a reliable result by changing a measurement path in real time. In addition, the present disclosure can measure nanoparticles for all the samples rather than measuring only some of the samples as in the existing measurement method, thereby improving the reliability of the result.

An area irradiated with an actual laser light source is measured while maintaining a very high linear velocity in a thin flow path in order to measure a sample flowing in a very small area. In this instance, an image of plasma is greatly distorted due to the high speed. In some cases, since it is difficult to detect due to a change in a contrast ratio, reproducibility or detection sensitivity is reduced. In order to improve this, the present disclosure tries to detect an image in an instantaneous static state using a flow pulse such as a pulsed laser. To this end, there is a need for a flow cell that can flow without eddy and is manufactured so that a laser beam is incident and generates a maximum signal value. In addition, a flow controller that can control the speed for a temporary static state controls the linear speed by temporarily operating an internal piston pump with a pulse width. More specifically, the flow controller may be configured to control a flow rate of the liquid sample to correspond to the pulse width. The present disclosure can increase the detection probability and sensitivity of plasma and improve the accompanying problem such as distortion or contrast ratio and shock wave sensitivity to thereby effectively improve the reliability of result by detecting the plasma signal value generated by the pulsed laser beam in the instantaneous static state of the liquid sample by the flow controller.

A flow nanoparticle measurement device may use the LIBD method. The LIBD method allows a pulsed laser beam with a time width of several nanoseconds to be incident through a lens and uses a principle of a laser-induced plasma generated in a focal region of the lens when the laser beam is incident. More specifically, when the pulsed laser beam is irradiated to nanoparticles, an energy level of the nanoparticles becomes an excited state, and then energy is released to exist in a stable state, i.e., a ground state (or excited state). Due to the energy released in this process, plasma or shock waves are generated in the nanoparticles.

In this instance, a phenomenon of generating plasma or shock wave is called a breakdown phenomenon, which requires the minimum energy required for particles to generate a plasma, and this is called a threshold energy. The threshold energy depends on a phase of a material because an ionization energy required for each material is different. The threshold energy requires the highest energy in a gaseous state, and decreases in the order of liquid and solid states.

The energy of the laser beam required to generate the laser-induced plasma increases in the order of solid, liquid, and gas. Therefore, when the appropriate laser beam energy is used, a laser-induced plasma state can be generated by breaking down only solid particles in an aqueous solution.

The concentration and size of nanoparticles can be analyzed by taking advantage of the characteristic that the breakdown probability varies depending on the particle concentration under the condition of a fixed laser beam energy and the characteristic that the threshold energy of the laser beam required for the breakdown varies depending on the particle size.

The flow nanoparticle measurement device can compensate for problem and reliability that may occur when particles are detected according to the above theory. In most particle analysis devices, contamination may occur in the process of collecting and analyzing a sample, and there is a possibility that the value may be mistaken for a value due to a contaminant. Since a high-purity material is easily contaminated, the device was developed to allow sample injection and direct analysis by minimizing contamination using a specially designed flow cell.

FIG. 1 schematically illustrates a flow nanoparticle measurement device according to an embodiment of the present disclosure.

A flow nanoparticle measurement device 1 may include a laser generator 10 and a flow device 20. The flow device 20 may include a flow cell 30, an inlet portion 41, and an outlet portion 42. A liquid sample may enter the flow device 20 through the inlet portion 41. The liquid sample entering the flow device 20 may pass through the flow cell 30. The liquid sample passing through the flow cell 30 may be discharged to the outside through the outlet portion 42.

The laser generator 10 may include a laser generating device 12, an optical diaphragm 13, a mirror 14, a beam splitter 16, an energy detector 17, a lens 18, and a beam block 19.

The laser generating device 12 may generate a pulsed laser beam B. A wavelength of the pulsed laser beam B is not limited. The pulsed laser beam B may be irradiated using Q-switching. The pulsed laser beam B may be repeatedly irradiated with a pulse of a predetermined period T1 (see FIG. 6). That is, the laser generating device 12 may irradiate the pulsed laser beam B so that on/off is repeated with a first period T1. The pulsed laser beam B generated by the laser generating device 12 may include Nd:YAG pulsed laser beam with a wavelength of 532 nm. However, the present disclosure is not limited thereto, and a type and an energy magnitude of the laser beam irradiated by the laser generating device 12 may be variously applied.

The optical diaphragm 13 may be provided at one side of the laser generating device 12 and may adjust a diameter of the pulsed laser beam that is emitted by the laser generating device 12 and then is incident. A diameter of the laser beam emitted by the laser generating device 12 may be variably adjusted by the optical diaphragm 13.

The mirror 14 is provided on a path of the pulsed laser beam B and may convert the path of the pulsed laser beam B. In addition, at least one mirror is disposed on the path of the pulsed laser beam B and thus can allow only the pulsed laser beam B with a desired wavelength to reach the flow cell 30.

The beam splitter 16 may adjust the path of the pulsed laser beam B. The beam splitter 16 may split the pulsed laser beam B into several paths at a predetermined ratio. The beam splitter 16 may adjust intensity of the laser beam branched from the pulsed laser beam B.

The beam splitter 16 may adjust a path of at least a part beam B1 of the incident pulsed laser beams B to be directed toward the flow cell 30. For example, the beam splitter 16 may split the pulsed laser beam B into a first laser beam B1 and a second laser beam B2. That is, the pulsed laser beam B incident on the beam splitter 16 may be split into the first laser beam B1 and the second laser beam B2. The optical characteristics of the first laser beam B1 may correspond to the optical characteristics of the pulsed laser beam B. For example, the first laser beam B1 may be a pulse laser with a predetermined period. For example, a pulse period of the first laser beam B1 may be a first period T1 (see FIGS. 6 and 7). Thus, the first laser beam B1 may be referred to as a "pulsed laser beam". In other words, "a pulsed laser beam incident on the flow cell" may indicate "a first laser beam incident on the flow cell".

For example, a traveling direction of the first laser beam B1 may be different from a traveling direction of the pulsed laser beam B incident on the beam splitter 16. For example, the traveling direction of the first laser beam B1 may be perpendicular to the traveling direction of the pulsed laser beam B incident on the beam splitter 16. For example, a traveling direction of the second laser beam B2 may be the same as or parallel to the traveling direction of the pulsed laser beam B incident on the beam splitter 16.

For example, power of the first laser beam B1 generated by the beam splitter 16 may be less than power of the pulsed laser beam B incident on the beam splitter 16. For example, the power of the first laser beam B1 generated by the beam splitter 16 may be the same as power of the second laser beam B2 generated by the beam splitter 16.

The energy detector 17 may measure the power (or energy) of the second laser beam B2. The energy detector 17 may face the beam splitter 16. The second laser beam B2 generated by the beam splitter 16 may be incident on the energy detector 17. The traveling direction of the second laser beam B2 may form an angle with the traveling direction of the first laser beam B1.

The power (or energy) of the first laser beam B1 may correspond to the power (or energy) of the second laser beam B2. Thus, a power (or energy) measurement value measured by the energy detector 17 may be used to calculate the power (or energy) of the first laser beam B1. For example, if the power of the first laser beam B1 is the same as the power of the second laser beam B2, the power measured by the energy detector 17 may be the power of the first laser beam B1.

The lens 18 may be disposed between the beam splitter 16 and the flow cell 30. For example, the first laser beam B1 generated by the beam splitter 16 may be incident on the lens 18. The optical characteristics of the first laser beam B1 may be changed while passing through the lens 18. For example, a focus of the first laser beam B1 passing through the lens 18 may be one point of the flow cell 30.

In other words, the lens 18 may adjust an irradiation area and a focal length of the first laser beam B1 incident on the flow cell 30. The focal length of the first laser beam B1 may refer to a distance between the focus of the first laser beam B1 passing through the lens 18 and the lens 18. The lens 18 can improve the detectability of nanoparticles by adjusting the irradiation area of the first laser beam B1 incident on the flow cell 30. A focal length of the lens 18 may be adjusted based on a Gaussian distribution with respect to the generation of induced plasma of nanoparticles by the first laser beam B1. The focal length of the first laser beam B1 may be set to 10 to 40 mm, but is not limited thereto.

A location at which the induced plasma is generated in the flow cell 30 may correspond to a location at which the first laser beam B1 collides with the nanoparticles. A liquid sample flowing in the flow cell 30 may have a unique refractive index. Thus, the focal length of the first laser beam B1 may vary depending on a type of the liquid sample flowing in the flow cell 30. For the measurement of various liquid samples, it may be necessary to appropriately adjust the focal length. To this end, the location at which the induced plasma is generated in the flow cell 30 may be controlled by adjusting a distance between the lens 18 and the flow cell 30 depending on the type of the liquid sample. The distance between the lens 18 and the flow cell 30 may be adjusted by a controller 70. For example, the controller 70 may control the position of the lens 18 by moving the lens 18.

The beam block 19 may face the flow cell 30. The flow cell 30 may be positioned between the lens 18 and the beam block 19. For example, the first laser beam B1 may be incident on the beam block 19 after passing through the flow cell 30. The beam block 19 may suppress the travel of the incident first laser beam B1. For example, the beam block 19 may block (or shield) the incident first laser beam B1.

The flow cell 30 may form a flow path F. In FIG. 1, the flow path F may be indicated by a dotted line. The flow path F may be formed outside and inside the flow cell 30. The flow path F may indicate a path through which the liquid sample flows. The flow path F may indicate a direction in which the liquid sample flows. In this context, the flow path F may be referred to as a "flow direction".

The flow path F, in a narrow sense, may refer to a path through which the liquid sample flows in the flow cell 30. The flow cell 30 may include a cell inlet 32 and a cell outlet 34.

The flow path F formed inside the flow cell 30 may extend from the cell inlet 32 and lead to the cell outlet 34. For example, the liquid sample may enter the inside of the flow cell 30 through the cell inlet 32 and may be discharged to the outside of the flow cell 30 through the cell outlet 34.

The flow path F, in a broad sense, may refer to a path through which the liquid sample flows within the flow device 20. The flow path F formed inside the flow device 20 may extend from the inlet portion 41 and lead to the outlet portion 42.

The flow nanoparticle measurement device 1 may include a detector 60, a flow controller 50, and the controller 70. The description of the detector 60, the flow controller 50, and the controller 70 may be included in the description of FIG. 2.

Figure 2:
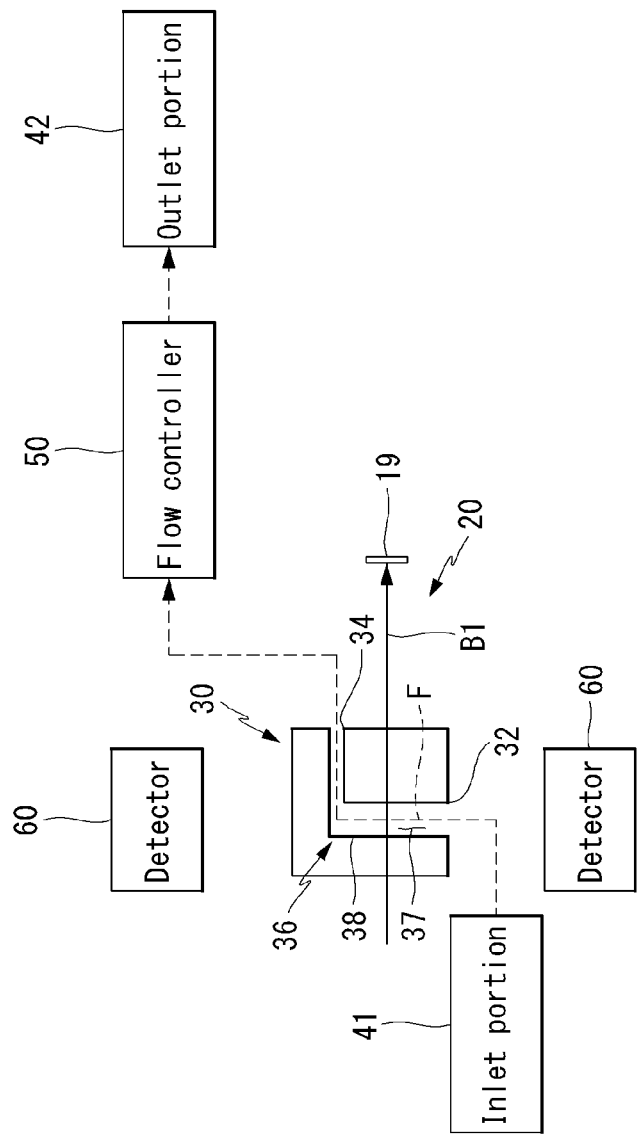
FIG. 2 illustrates configurations related to a flow device of a flow nanoparticle measurement device according to an embodiment of the present disclosure.
Figure 3A:
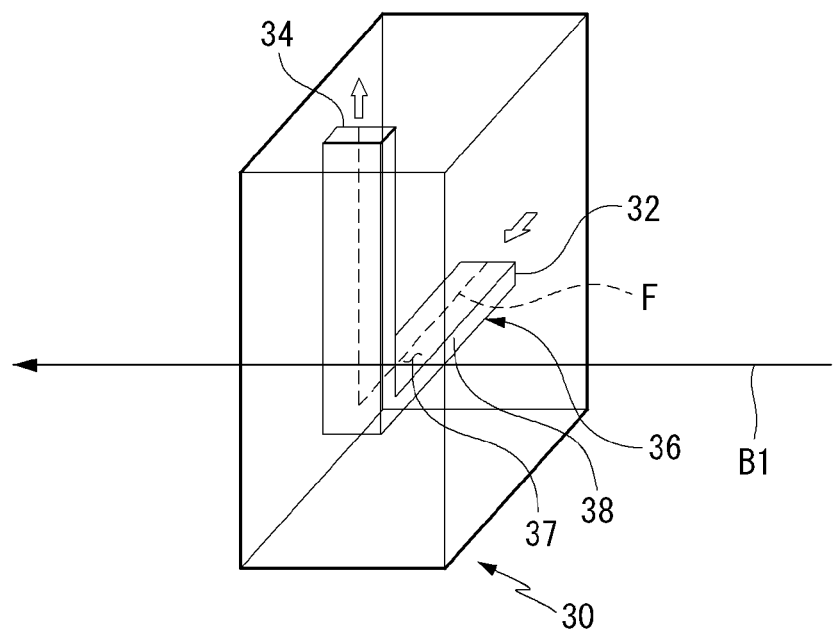
FIGS. 3A and 3B illustrate a flow cell of a flow nanoparticle measurement device according to an embodiment of the present disclosure.
Figure 3B:
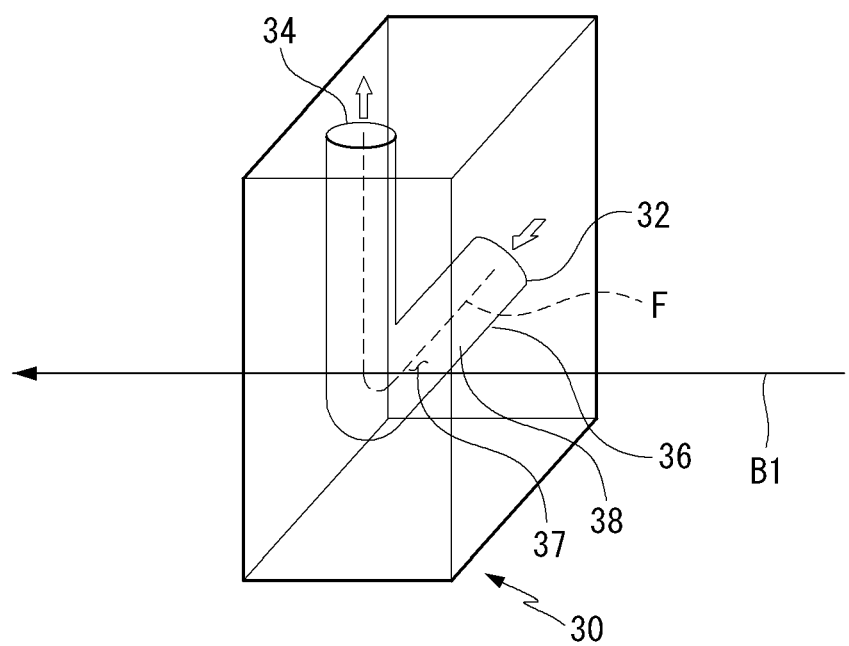

FIG. 2 illustrates configurations related to a flow device of a flow nanoparticle measurement device according to an embodiment of the present disclosure. FIGS. 3A and 3B illustrate a flow cell of a flow nanoparticle measurement device according to an embodiment of the present disclosure.

The flow device 20 may be configured to flow the liquid sample.

The flow cell 30 may be configured to flow the liquid sample in the flow cell 30. The flow cell 30 may include the cell inlet 32 into which the liquid sample is introduced, and the cell outlet 34 into which the liquid sample flows out. The flow cell 30 may be formed of a material containing a quartz, but is not limited thereto. For example, the flow cell 30 may be formed of a material including a polymer material such as acrylic.

It is described and illustrated that a shape of the flow cell 30 has a rectangular external shape, but the shape is not limited. When the flow cell 30 is composed of a rectangular cell, the detector 60 to be described later may be positioned in a direction perpendicular to an outer surface of the rectangular cell, or positioned in a direction inclined from the outer surface of the rectangular cell at a predetermined angle. However, the shape of the flow cell 30 and the arrangement of the detector 60 according to the shape of the flow cell 30 are not limited.

The flow cell 30 may be configured so that the liquid sample flows inside the flow cell 30. At least a part of the flow cell 30 may be made of a light transmission material so that the first laser beam B1 is irradiated to the liquid sample positioned in the flow cell 30.

The flow cell 30 may include a flow portion 36 in which the liquid sample flows. The flow portion 36 may be a space formed in the flow cell 30. The flow path F in a narrow sense may be formed by the flow portion 36. The flow portion 36 may extend from the cell inlet 32 and lead to the cell outlet 34. For example, the flow portion 36 may be connected to an opening formed in the cell inlet 32. For example, the flow portion 36 may be connected to an opening formed in the cell outlet 34. The cell outlet 34 may be spaced apart from the cell inlet 32.

The flow portion 36 may be formed to extend from the cell inlet 32, bend and extend again, and lead to the cell outlet 34. For example, the flow portion 36 may form a bent shape. An end of the flow portion 36 may be connected to the cell inlet 32, and another end of the flow portion 36 may lead to the cell outlet 34.

An inner diameter of the flow portion 36 may be formed within 10 mm, but is not limited thereto. The size and shape of the inner diameter of the flow portion 36 may be variously applied. For example, as illustrated in FIG. 3A, a cross section of the flow portion 36 may have a rectangular shape. Alternatively, as illustrated in FIG. 3B, the cross section of the flow portion 36 may has a circular shape.

When the flow portion 36 is formed in the circular cross section as illustrated in FIG. 3B, a distance between the flow portion 36 and the detector 60 may be configured to be the same even if a direction in which the detector 60 is arranged with respect to the flow portion 36 is changed. Hence, restrictions on the arrangement of the detector 60 can be reduced, and thus the reliability of detection results can be improved.

In addition, when the flow portion 36 is formed in the rectangular cross section as illustrated in FIG. 3A, the first laser beam B1 may be irradiated in a direction perpendicular to the flow portion 36 or a plasma signal may be received. Hence, the distortion such as refraction of the signal can be reduced. Through this configuration, more accurate detection results can be obtained.

In addition, when the flow portion 36 is formed in the rectangular cross section as illustrated in FIG. 3A, a larger flow path can be formed with respect to the same width, and thus a smooth flow of the liquid sample can be derived.

However, the shape of the flow portion 36 is not limited. For example, at least a part of the flow portion 36 may be formed in a curved surface, and the rest of the flow portion 36 may be formed in a flat surface. That is, the cross section of the flow portion 36 may be formed in a shape in which a curved surface and a polygon are combined. When a portion of the flow portion 36 is formed in a curved surface, the detection intensity can be maximized, and furthermore, the generation of bubbles in the liquid sample according to the flow rate can be minimized.

The size of the inner diameter of the flow portion 36 may be uniformly formed over the entire flow path F, and may vary along the flow path F. More specifically, the flow portion 36 is divided into a plurality of sections, and each section may have a different inner diameter, or a main flow portion 38 of the flow portion 36 to be described later may have a different inner diameter and a different shape from other sections of the flow portion 36. The size and shape of the inner diameter of the flow portion 36 are not limited.

The flow portion 36 may include the main flow portion 38 transmitting the first laser beam B1. The main flow portion 38 may form at least a part of a flow space 37 in which the liquid sample flows. The first laser beam B1 may be irradiated to the main flow portion 38. The flow space 37 may form a flow path through which the liquid sample flows in one direction. The main flow portion 38 may form a part of the flow space 37. The main flow portion 38 transmitting the first laser beam B1 may be a part of the flow portion 36 or may be all of the flow portion 36. As illustrated in FIGS. 3A and 3B, a portion before the flow portion 36 is bent may be the main flow portion 38. However, the present disclosure is not limited thereto. For example, a portion after the flow portion 36 is bent may be the main flow portion 38, and the entire flow portion 36 may be defined as the main flow portion 38. The position of the main flow portion 38 on the flow portion 36 is not limited.

For example, as illustrated in FIG. 2, the main flow portion 38 may be formed to extend from the cell inlet 32 in one direction. For another example, the main flow portion 38 may be formed to extend from the cell outlet 34 in one direction.

The first laser beam B1 may be irradiated to the flow path of the liquid sample passing the main flow portion 38. More specifically, the first laser beam B1 may be irradiated to the center of the flow path of the liquid sample passing the main flow portion 38. However, the irradiation position of the pulsed laser beam B1 with respect to the main flow portion 38 is not limited thereto.

The first laser beam B1 may pass through the main flow portion 38. In other words, the main flow portion 38 is formed to extend in one direction and may pass the path of the first laser beam B1. For example, in the main flow portion 38, a flow direction F of the liquid sample and the irradiation direction of the first laser beam B1 may be perpendicular to each other. That is, the extending direction of the main flow portion 38 and the incident direction of the first laser beam B1 may be perpendicular to each other. The main flow portion 38 may be formed to extend from the cell inlet 32 in one direction.

For the irradiation of the first laser beam B1, at least a part of the flow cell 30 including the main flow portion 38 may include a light transmission material. Hence, the first laser beam B1 may pass through the flow cell 30 and may be irradiated to the liquid sample passing the main flow portion 38.

However, the present disclosure is not limited thereto, and the flow direction F of the liquid sample and the irradiation direction of the pulsed laser beam B1 may be adjusted to a predetermined angle. An angle formed by the flow direction F and the irradiation direction of the pulsed laser beam B1 may be differently applied depending on the type of the detector 60.

The flow device 20 may include the inlet portion 41 and the outlet portion 42.

The liquid sample may pass through the inlet portion 41 and may be introduced into the flow cell 30. After the liquid sample is discharged from the flow cell 30, the liquid sample may be discharged to the outside of the flow device 20 through the outlet portion 42.

The flow device 20 may be connected to a reservoir in which the liquid sample is stored. For example, the inlet portion 41 and the outlet portion 42 may be connected to the reservoir. The liquid sample may be introduced into the flow device 20 from the reservoir through the inlet portion 41. The liquid sample may be introduced into the reservoir from the flow device 20 through the outlet portion 42. However, the present disclosure is not limited thereto, and the inlet portion 41 and the outlet portion 42 may be connected to independent reservoirs, respectively.

The flow device 20 may include the flow controller 50.

The flow controller 50 may be disposed on the path of the liquid sample. The flow controller 50 may control a flow rate and a flow amount of the liquid sample passing the flow cell 30. The controller 70 may control the flow rate or flow amount of the liquid sample passing the flow cell 30 by controlling the flow controller 50.

As illustrated in FIG. 1, the flow controller 50 may be positioned on a path between the flow cell 30 and the outlet portion 42. That is, since the flow controller 50 is disposed downstream in the flow path of the liquid sample, contamination of the liquid sample to be measured can be minimized. However, the arrangement of the flow controller 50 is not limited.

For example, the flow controller 50 may be positioned on a path between the flow cell 30 and the inlet portion 41. The flow controller 50 is configured to control the flow rate of the liquid sample flowing in the flow cell 30, and may satisfy this if it is disposed at a position at which the liquid sample is not contaminated.

The flow controller 50 may control the flow rate so that a predetermined flow amount of the liquid sample is positioned in the main flow portion 38 in a stationary state. That is, the flow controller 50 may control the flow rate so that the liquid sample repeatedly flows with a pulse of a predetermined period T2 (see FIG. 6). In other words, the flow controller 50 may control the flow rate of the liquid sample so that the liquid sample flows in the form of a pulse wave of a second period T2 (see FIGS. 6 and 7).

Figure 6:
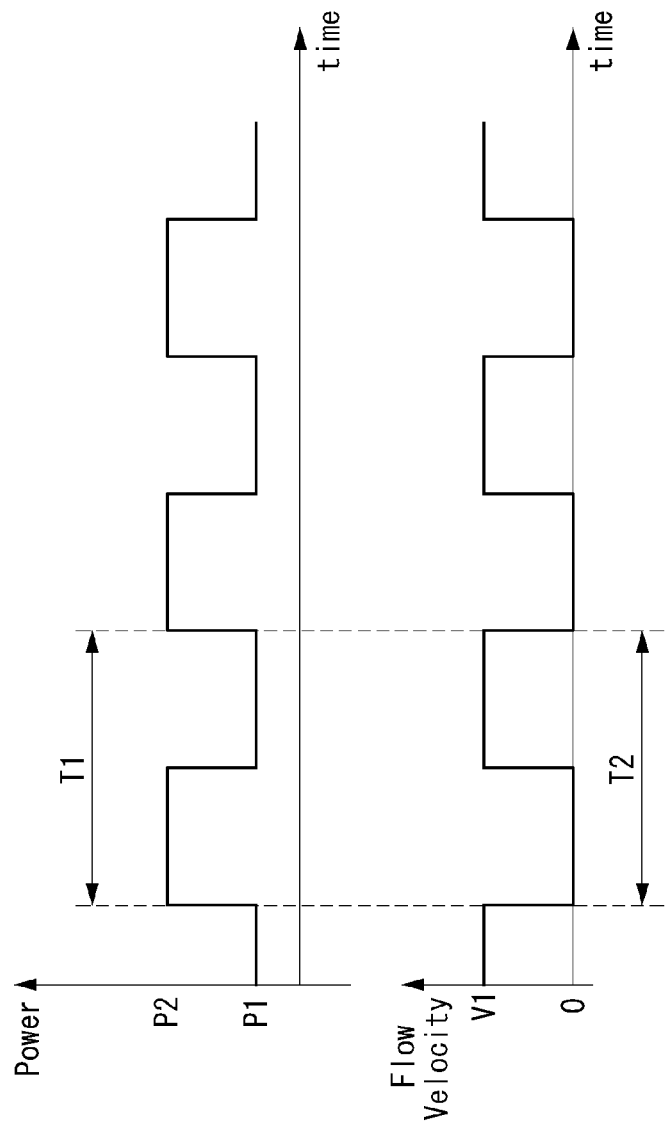
FIG. 6 illustrates an operation depending on time in a flow nanoparticle measurement device according to an embodiment of the present disclosure.
Figure 7:
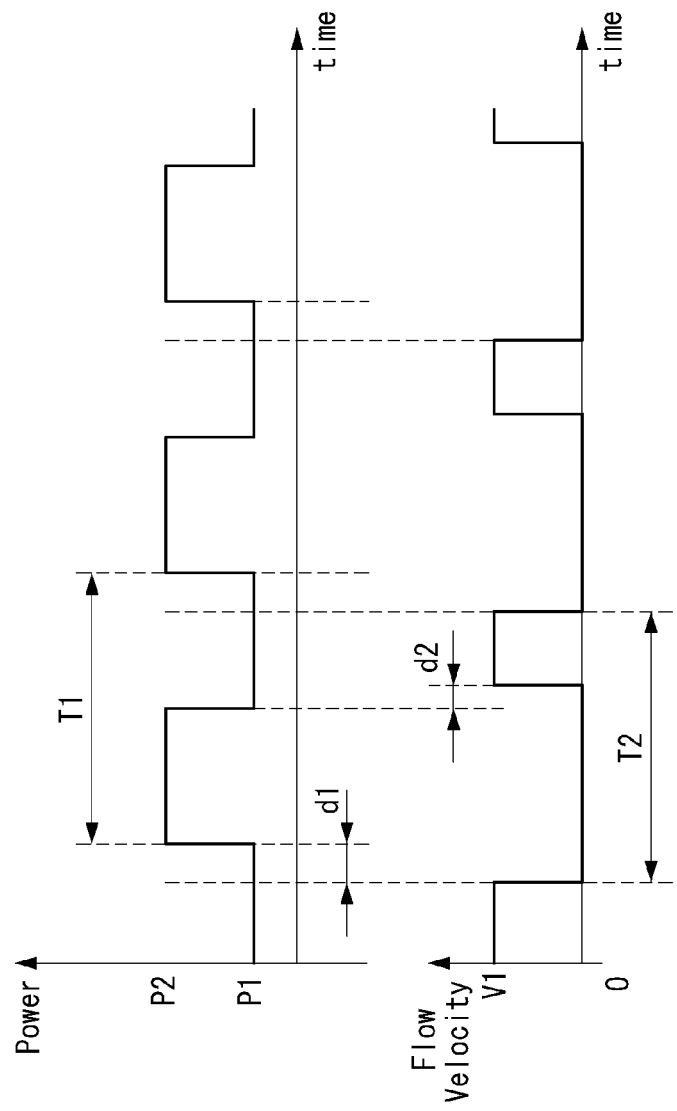
FIG. 7 illustrates an operation depending on time in a flow nanoparticle measurement device according to another embodiment of the present disclosure.

The flow controller 50 may be configured so that the flow state and the flow stop state of the liquid sample alternately repeat in the second period T2 (see FIGS. 6 and 7). The flow state is a state in which the liquid sample flows through the flow portion 36, and the flow stop state may indicate that the liquid sample is disposed in a state in which the flow is stopped in the flow portion 36.

As illustrated in FIG. 6, the flow controller 50 may be configured so that the liquid sample alternately flows between the flow state and the flow stop state in the form of a pulse. When the flow controller 50 controls the liquid sample to be in the flow state, the liquid sample may flow through the flow portion 36 at a first flow velocity V1. FIG. 6 illustrates that the first flow velocity V1 has a constant velocity, for convenience of description, but a magnitude and change of the first flow velocity V1 are not limited thereto. When the flow controller 50 controls the liquid sample to be in the flow stop state, the flow of the liquid sample in the flow portion 36 may be stopped.

The flow controller 50 may repeatedly operate in the flow state and the flow stop state based on the signal received by the controller 70, and may mechanically operate repeatedly in the flow state and the flow stop state. A method of implementing the operation of the flow controller 50 is not limited. This may be satisfied if the flow of the liquid sample is controlled by the flow controller 50.

The flow operation of the liquid sample by the flow controller 50 may correspond to irradiation of the first laser beam B1 by the laser generating device 12. For example, the first period T1 of the first laser beam B1 and the second period T2 of the flow controller 50 may be the same. For example, the flow controller 50 may control the flow rate of the liquid sample passing the flow cell 30 so that the second period T2 of the flow controller 50 is the same as the period T1 of the first laser beam B1.

Referring to FIG. 6, a time at which the flow stop state of the liquid sample starts may be synchronized with a time at which the output of the first laser beam B1 becomes a second output P2. Referring to FIG. 7, the time at which the output of the first laser beam B1 becomes the second output P2 may be later than the time, at which the flow stop state of the liquid sample starts, by a first delay time d1.

When the flow controller 50 stops the flow of the liquid sample passing the main flow portion 38, the laser generator 10 may generate an induced plasma in the nanoparticles in the liquid sample by irradiating the first laser beam B1 to the main flow portion 38 of the flow cell 30.

Afterwards, when the flow controller 50 controls the liquid sample to be in the flow state, the flow controller 50 may flow the liquid sample, in which the induced plasma is generated by flowing the liquid sample, to the downstream, and may introduce the liquid sample, in which the induced plasma is not generated, into the main flow portion 38. When the liquid sample flows, the laser generator 10 may control the output of the first laser beam B1 so that the induced plasma is not generated in the liquid sample.

When the flow controller 50 stops the flow of the liquid sample passing the main flow portion 38, the pulsed laser beam B1, as the second output P2, is irradiated to the main flow portion 38 of the flow cell 30 by the laser generator 10, and thus the induced plasma may be generated in the nanoparticles in the liquid sample.

The present disclosure can measure the nanoparticles of the flowing liquid sample and improve the reliability of the nanoparticle measurement by repeating the processes.

The flow device 20 may be configured such that the flow amount of the liquid sample passing the main flow portion 38 in the flow state is equal to or greater than an amount of the liquid sample positioned in the main flow portion 38 in the flow stop state. Through this configuration, the liquid sample exposed to the first laser beam B1 of the second output P2 is again exposed to the first laser beam B1 of the second output P2, thereby preventing an error in the nanoparticle measurement.

The flow device 20 may include a separation unit (not shown) for separating the nanoparticles in the liquid sample before the liquid sample containing the nanoparticles is introduced into the flow cell 30. The separation unit may be disposed between the flow cell 30 and the inlet portion 41 to separate nanoparticles from the liquid sample introduced into the flow cell 30. The separation of nanoparticles may be performed based on the type of nanoparticles or the size of the nanoparticles.

Figure 4:
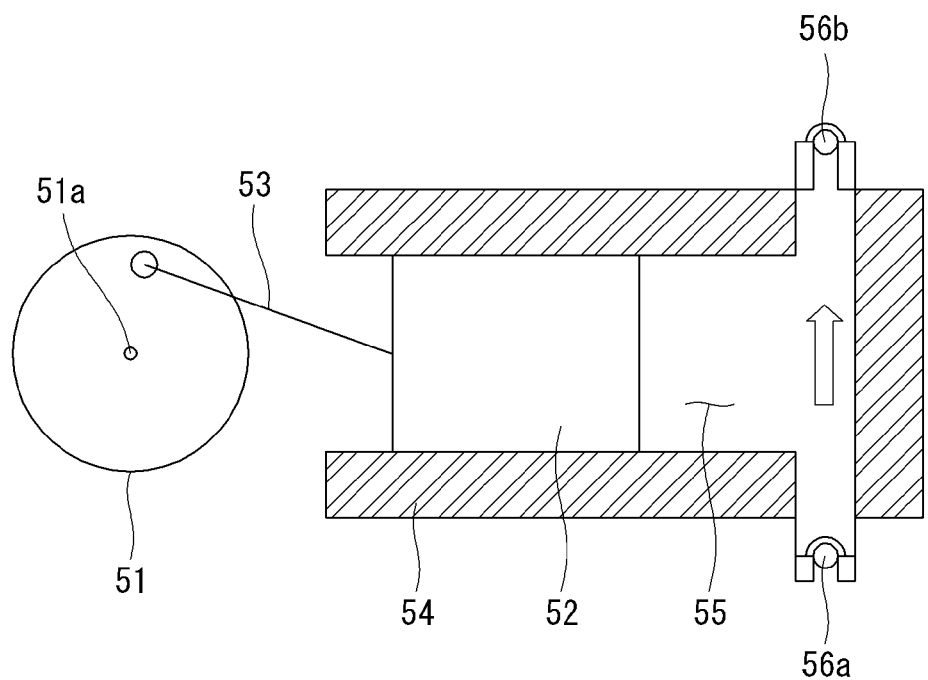
FIG. 4 illustrates an example of a flow controller of a flow nanoparticle measurement device according to an embodiment of the present disclosure.

FIG. 4 illustrates an example of a flow controller of a flow nanoparticle measurement device according to an embodiment of the present disclosure.

The flow controller 50 may be configured to control the flow of the liquid sample. The flow controller 50 may operate in response to a control signal received from the controller 70.

The flow controller 50 may include a single piston pump. However, the present disclosure is not limited thereto. This may be satisfied if the flow controller 50 is configured to receive a signal from the controller 70 and control the flow rate of the liquid sample so that the signal corresponds to the pulse of the pulsed laser beam B. As an example, the flow controller 50 may include a magnetic valve for controlling the flow amount and the flow rate of the liquid sample.

The flow controller 50 may include a cam 51 that rotates according to the first cycle T1 (see FIGS. 6 and 7) of the first laser beam B1 (see FIG. 1), a cylinder 54, a piston 52 that is positioned inside the cylinder 54 and moves, and a connecting rod 53 having one end that is rotatably connected to the cam 51, and other end that is rotatably connected to the piston 52 and transfers a rotational force of the cam 51 to the piston 52. An inner space 55 may indicate a space formed in the cylinder 54. A boundary of the inner space 55 may be determined by the piston 52. The piston 52 may be disposed in the inner space 55. The piston 52 may be coupled to the cylinder 54 to reciprocate in one direction.

The cam 51 may rotate about a rotation shaft 51*a*. The one end of the connecting rod 53 may be rotatably connected to the cam 51 at a location spaced apart from the rotation shaft 51*a*. When the cam 51 rotates, the piston 52 may reciprocate inside the cylinder 54 through the connecting rod 53.

The flow controller 50 may adjust a flow period of the liquid sample by controlling a rotation speed of the cam 51. That is, the flow controller 50 may adjust a period for the flow state and the flow stop state of the liquid sample by controlling the rotation speed of the cam 51. The flow amount of the liquid sample may be controlled by the rotation speed of the cam 51, an arrangement relationship between the rotation shaft 51*a* of the cam 51 and the connecting rod 53, an internal volume of the cylinder 54, and the like. For example, the flow amount of the liquid sample may be controlled by adjusting the flow amount of the liquid sample.

The flow controller 50 may include valves 56*a* and 56*b*. In this embodiment, the valves 56*a* and 56*b* may include a pair of valves 56*a* and 56*b*. One valve 56*a* of the pair of valves 56*a* and 56*b* may be disposed at a liquid sample inlet of the cylinder 54. The other valve 56*b* of the pair of valves 56*a* and 56*b* may be disposed at a liquid sample outlet of the cylinder 54.

The valve 56*a* disposed at the liquid sample inlet of the cylinder 54 may be referred to as an inlet valve 56*a*. The valve 56*b* disposed at the liquid sample outlet of the cylinder 54 may be referred to as an outlet valve 56*b*. The inlet valve 56*a* may be connected to the flow cell 30 (see FIG. 1). The outlet valve 56*b* may be connected to the outlet portion 42 (see FIG. 1).

The valves 56*a* and 56*b* may include a backflow prevention valve. For example, the backflow prevention valve may be a check valve. The inlet valve 56*a* allows the liquid sample to be introduced into the inner space 55, but may suppress the liquid sample from being discharged to the outside of the inner space 55. The outlet valve 56*b* allows the liquid sample to be discharged to the outside of the inner space 55, but may suppress the liquid sample from being introduced into the inner space 55.

The piston 52, the inlet valve 56*a*, and the outlet valve 56*b* may be connected to the inner space 55. In other words, the piston 52, the inlet valve 56*a*, and the outlet valve 56*b* may form a portion of a boundary of the inner space 55.

When the inner space 55 of the cylinder 54 is pressurized by the piston 52, the inlet valve 56*a* may be closed, and the outlet valve 56*b* may be opened. In this process, the liquid sample in the inner space 55 may be discharged to the outside of the flow controller 50 through the outlet valve 56*b*. When the inlet valve 56*a* is closed, the flow of the liquid sample positioned further upstream than the flow controller 50 may be stopped. That is, when the inner space 55 of the cylinder 54 is pressurized by the piston 52, the flow of the liquid sample in the flow cell 30 may be stopped. When the inner space 55 of the cylinder 54 is pressurized by the piston 52, it may mean that the inner space of the cylinder 54 is reduced by the piston 52.

On the contrary, when the piston 52 operates in the opposite direction to a pressurization direction, the outlet valve 56*b* may be closed, and the inlet valve 56*a* may be opened. When the piston 52 operates in a direction opposite to the pressurization direction, it may mean that the inner space 55 of the cylinder 54 is increased by the piston 52. In this process, the liquid sample outside the cylinder 54 may be introduced into the inner space 55 of the cylinder 54 through the opened inlet valve 56*a*.

When the inner space 55 of the cylinder 54 is increased by the piston 52, the inlet valve 56*a* may be opened. When the inlet valve 56*a* is opened, the liquid sample may be introduced into the inner space 55 of the cylinder 54 through the inlet valve 56*a*. When the liquid sample is introduced into the inner space 55 of the cylinder 54 through the inlet valve 56*a*, the liquid sample positioned in the flow cell 30 may flow. That is, when the inner space 55 of the cylinder 54 is increased by the piston 52, the liquid sample positioned in the flow cell 30 may flow.

It is illustrated and described that the flow cell 30 is disposed further upstream than the flow controller 50, by way of example, but the present disclosure is not limited thereto. When the flow cell 30 is disposed further downstream than the flow controller 50, the above operation may be performed reversely.

That is, the movement of the piston 52 in the pressurization direction may allow the liquid sample in the flow cell 30 to operate in the flow state, and the movement of the piston 52 in the opposite direction to the pressurization direction may allow the liquid sample in the flow cell 30 to stop flowing. In other words, for example, the inlet valve 56*a* may be connected to the inlet portion 41 (see FIG. 1), and the outlet valve 56*b* may be connected to the flow cell 30 (see FIG. 1). For example, when the inner space 55 of the cylinder 54 is pressurized by the piston 52, the liquid sample in the flow cell 30 (see FIG. 1) may flow. For example, if the piston 52 moves in the opposite direction to the direction in which the cylinder 54 is pressurized, the liquid sample in the flow cell 30 (see FIG. 1) may not flow.

Through this process, the flow controller 50 may control the flow of the liquid sample with a predetermined period.

Referring to FIGS. 1 to 4, the flow nanoparticle measurement device 1 may include the detector 60.

The nanoparticles included in the liquid sample may be in a plasma state by the first laser beam B1. The detector 60 may detect a shock wave or scintillation generated in this process. The detector 60 may detect various signals generated in the plasma. The detector 60 may detect at least one of a spectrum of an element, a shock wave, an image of plasma, heat, and sound.

The detector 60 may include a shock wave detector that measures a laser-induced shock wave accompanied when a laser-induced plasma is generated. The detector 60 may include a scintillation detector 60 that detects scintillation accompanied when the laser-induced plasma is generated. When the induced plasma is generated in the nanoparticles by the first laser beam B1, characteristics of the laser induced plasma may vary depending on the size of the nanoparticles.

The shock wave detector may include at least one of a piezoelectric element and a microphone. The signal measured by the shock wave detector may be amplified by a lock-in amplifier.

The scintillation detector may include a CCD camera. The scintillation detector 60 may further include a notch filter disposed on an optical path toward the CCD camera in order to control a measurement error caused by scattered light. As illustrated in FIG. 1, each of the shock wave detector and the scintillation detector may be disposed adjacent to the flow cell 30. At least one of the shock wave detector and the scintillation detector may be disposed adjacent to the flow cell 30.

The detector 60 may acquire information about the nanoparticles through the detection of the shock wave or the scintillation. Information about the nanoparticles may include the number and/or the size of nanoparticles.

The detector 60 may be disposed inside the flow cell 30, or may be disposed outside the flow cell 30 as illustrated in FIG. 1. In addition, a plurality of detectors 60 may be disposed around the flow cell 30. The controller 70 may correct a detection value based on a distance from a location, at which the induced plasma is generated inside the flow cell 30, to the detector 60. The controller 70 may correct the detection value based on an angle between a direction toward the detector 60 at a location, at which the induced plasma is generated inside the flow cell 30, and the irradiation direction of the first laser beam B1. The type of the detector 60 is not limited, and the detector 60 may include various detectors such as a thermal sensor.

The flow nanoparticle measurement device 1 may include the controller 70.

The controller 70 may control the overall operation of the flow nanoparticle measurement device 1. For example, the controller 70 may control the laser generating device 12 and the flow controller 50. The controller 70 may control the laser generating device 12 to control the first cycle T1 (see FIGS. 6 and 7) and/or the output of the first laser beam B1. In addition, the controller 70 may control the flow controller 50 to control the second period T2 (see FIGS. 6 and 7) or the flow time of the liquid sample.

The control of the laser generating device 12 and the flow controller 50 by the controller 70 may be performed independently of each other. That is, the controller 70 may control each of the laser generating device 12 and the flow controller 50.

The controller 70 may move the lens 18 with respect to the flow cell 30 to adjust the focal length of the first laser beam B1.

The controller 70 may obtain information about the nanoparticles from the detector 60.

The controller 70 may pre-process the signal transmitted from the detector 60. The controller 70 amplifies the signal detected by the detector 60 using the lock-in amplifier and can remove a noise of a low frequency band of 100 Hz or less using a band filter. The filtered signal may be converted into a digital signal through a converter. The converted signal may be subjected to Fast Fourier Transformation (FFT) in real time by extracting signal values of some sections according to conditions. Through this process, the controller 70 may convert the signal from a function of time to a function of frequency and analyze a frequency component of the shock wave generated by the plasma. The controller 70 may determine the type, size, or number of nanoparticles based on the frequency component and the amplitude size converted from the detected shock wave.

The magnitude of the induced plasma increases as the size of the particles increases under the same output condition, and hence the size of the shock wave may also increase. Based on the frequency component and the amplitude size of the shock wave, the controller 70 may determine the type, size, or number of nanoparticles.

The controller 70 may determine the size or the number of nanoparticles based on the number and the size of scintillations detected by the scintillation detector.

The controller 70 may measure a concentration of the nanoparticles in the liquid sample based on the flow amount of the liquid sample flowing by the flow controller 50 and information on the nanoparticles detected by the detector 60.

The operation of the flow nanoparticle measurement device according to the present disclosure is described below.

Figure 5:
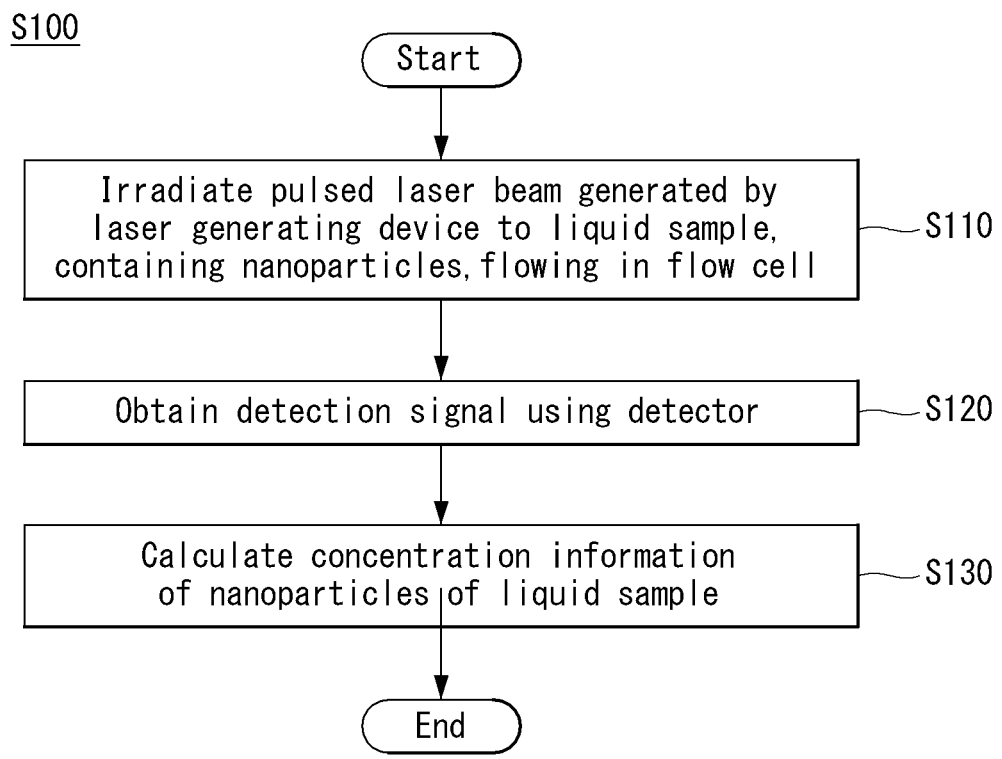
FIG. 5 is a flow chart illustrating a flow nanoparticle measurement method (S100) according to an embodiment of the present disclosure.

FIG. 5 is a flow chart illustrating a flow nanoparticle measurement method (S100) according to an embodiment of the present disclosure. FIG. 6 illustrates an operation depending on time in a flow nanoparticle measurement device according to an embodiment of the present disclosure.

In the flow chart illustrated in FIG. 5, the method is described by dividing the method into a plurality of steps, but at least some of the steps may be performed in a different order, performed together in combination with other steps, omitted, sub-divided into sub-steps, or performed by adding one or more steps that are not illustrated.

In FIG. 6, the second output P2 of the first laser beam B1 may be greater than the first output P1. For example, the first output P1 may be zero. The controller 70 may control the output of the first laser beam B1 over time.

Referring to FIGS. 1 to 5, the flow nanoparticle measurement device 1 may be configured to measure nanoparticles contained in the flowing liquid sample. The controller 70 may control the laser generating device 12 and the flow controller 50.

The flow device 20 may flow the liquid sample containing the nanoparticles to the main flow portion 38 of the flow cell 30. More specifically, the flow device 20 may introduce the liquid sample into the flow cell 30 through the cell inlet 32 and discharge the liquid sample to the outside of the flow cell 30 through the cell outlet 34. The flow rate of the liquid sample flowing through the flow device 20 may be controlled by the flow controller 50.

Referring to FIGS. 1 to 6, the flow controller 50 may control the flow rate of the liquid sample so that a predetermined flow amount of the liquid sample is positioned in the main flow portion 38 in a stationary state. That is, the flow controller 50 may be configured to repeatedly flow the liquid sample with the second cycle T2.

The pulsed laser beam B generated by the laser generating device 12 may be split into a first laser beam B1 and a second laser beam B2 by the beam splitter 16. The first laser beam B1 may pass through the lens 18 and may be irradiated to the main flow portion 38 of the flow cell 30. The first laser beam B1 may be repeatedly irradiated with a pulse of the first period T1.

A flow nanoparticle measurement method S100 according to an embodiment of the present disclosure may include a step S110 of irradiating a pulsed laser beam to the liquid sample flowing in the flow cell 30. In the step S110, the pulsed laser beam irradiated to the liquid sample may be the first laser beam B1. In the step S110, the controller 70 may control an output of the first laser beam B1 and irradiate the pulsed laser beam to the liquid sample.

The first period T1 of the first laser beam B1 may be the same as a period of the pulsed laser beam B. The first period T1 of the first laser beam B1 may be the same as the second period T2 of the flow controller 50. The flow controller 50 may control the flow rate of the liquid sample passing the flow cell 30 to correspond to a period of the pulsed laser beam B. For example, a time at which the flow stop state of the liquid sample starts may be synchronized with a time at which the output of the first laser beam B1 becomes the second output P2. For example, a time at which the flow state of the liquid sample starts may be synchronized with a time at which the output of the first laser beam B1 becomes the first output P1.

Through this, when the flow of the liquid sample passing the main flow portion 38 is stopped by the flow controller 50, the first laser beam B1 may be irradiated to the main flow portion 38 of the flow cell 30 to generate plasma in the nanoparticles in the liquid sample.

The flow nanoparticle measurement method S100 according to an embodiment of the present disclosure may include a step S120 of obtaining a detection signal using a detector. The first laser beam B1 may generate plasma or shock waves in the nanoparticles of the liquid sample stopped by the flow controller 50. The detector 60 may detect the generated plasma or shock waves to generate a detection signal. The detection signal may include information on the shock waves. In the step S120, the controller 70 may obtain the detection signal using the detector 60.

The flow nanoparticle measurement method S100 according to an embodiment of the present disclosure may include a step S130 of calculating concentration information of the liquid sample. In the step S130, the controller 70 may calculate the concentration information of nanoparticles contained in the liquid sample based on the flow rate of the liquid sample controlled by the flow controller 50 and the detection signal obtained from the detector 60.

The controller 70 may be configured to control the flow controller 50 so that the liquid sample repeats the flow state and the flow stop state with a predetermined period, and control the laser generator 10 so that the first laser beam B1 is irradiated with a predetermined period. Hence, the method can improve the reliability of the nanoparticle measurement by measuring the nanoparticles of the flowing liquid sample.

FIG. 7 illustrates an operation depending on time in a flow nanoparticle measurement device according to another embodiment of the present disclosure.

Referring to FIGS. 1 to 7, the flow nanoparticle measurement device 1 may be configured to measure the nanoparticles contained in the flowing liquid sample.

The first period T1 of the first laser beam B1 may be the same as the second period T2 of the flow controller 50.

In addition, a start time of the first period T1 of the first laser beam B1 may be delayed by the first delay time d1 from a start time of the second period T2 of the flow controller 50. In other words, a start time at which the first laser beam B1 operates as the second output P2 may be delayed by the first delay time d1 from a start time at which the flow velocity of the liquid sample becomes zero. Through this, after the flow of the liquid sample is stopped by the flow controller 50 and the first delay time d1 has elapsed, the first laser beam B1 may be irradiated to the flow cell 30.

A start time at which the flow velocity of the liquid sample becomes the first flow velocity V1 may be delayed by a second delay time d2 from a start time at which the first laser beam B1 becomes the first output P1. Through this, after the first laser beam B1 is irradiated to the flow cell 30 and the second delay time d2 has passed, the liquid sample may flow at the first flow velocity V1 and may be discharged from the flow cell 30.

Time for which the flow velocity of the liquid sample is maintained at zero during the second period T2 may be more than time for which the first laser beam B1 operates as the second output P2 during the first period T1. Hence, the first laser beam B1 is irradiated to the nanoparticles in which the induced plasma is not formed, and the induced plasma can be stably generated.

Figure 8:
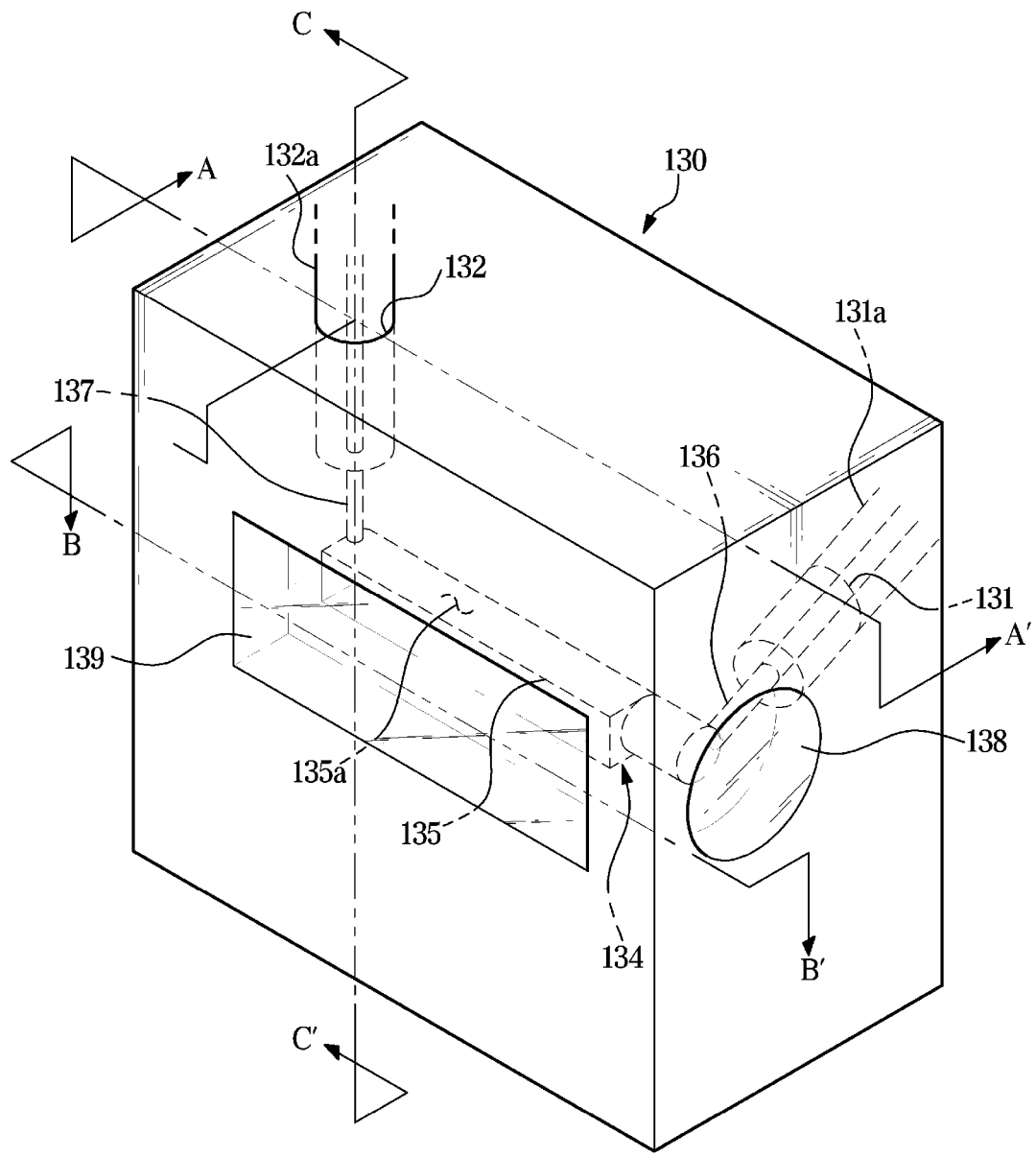
FIG. 8 is a perspective view of a flow cell according to an embodiment of the present disclosure.
Figure 9:
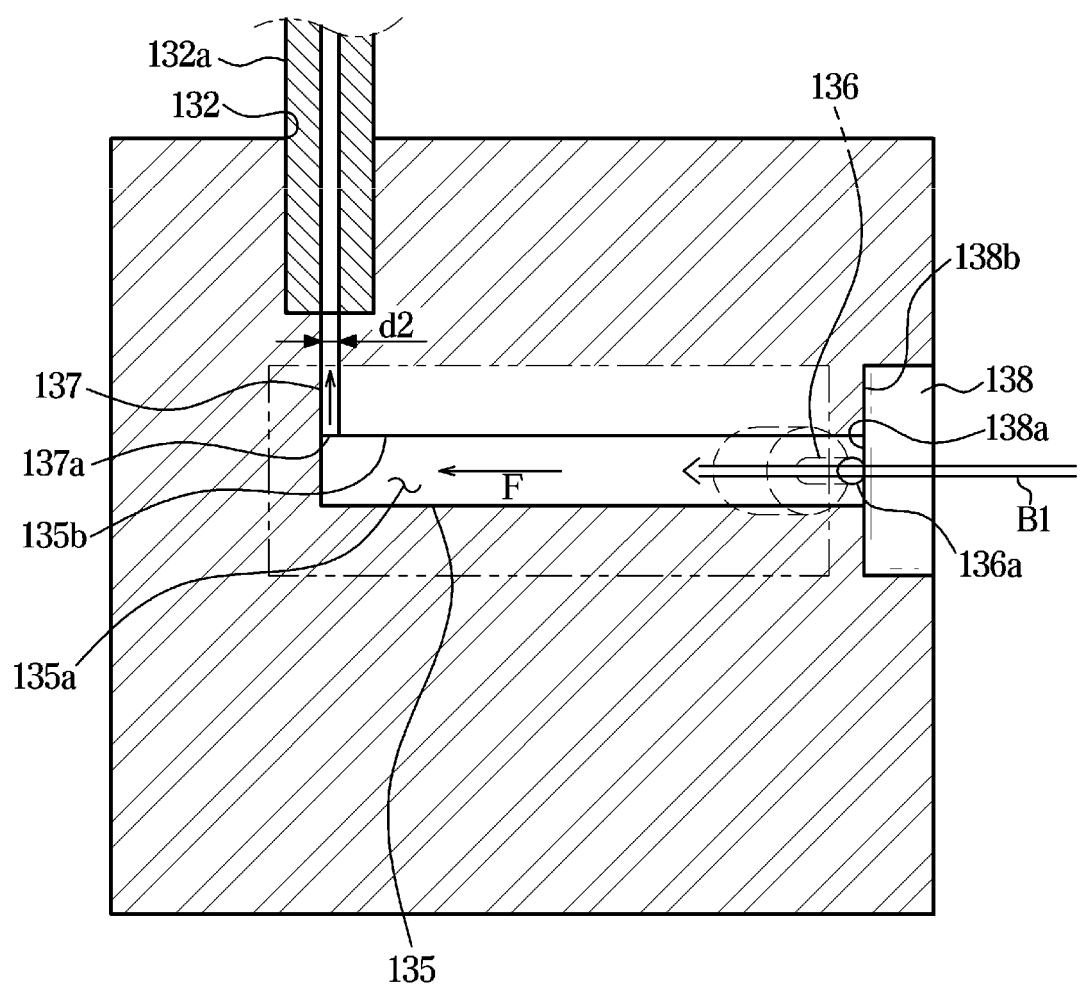
FIG. 9 is a cross-sectional view taken along A-A' of FIG. 8.
Figure 10:
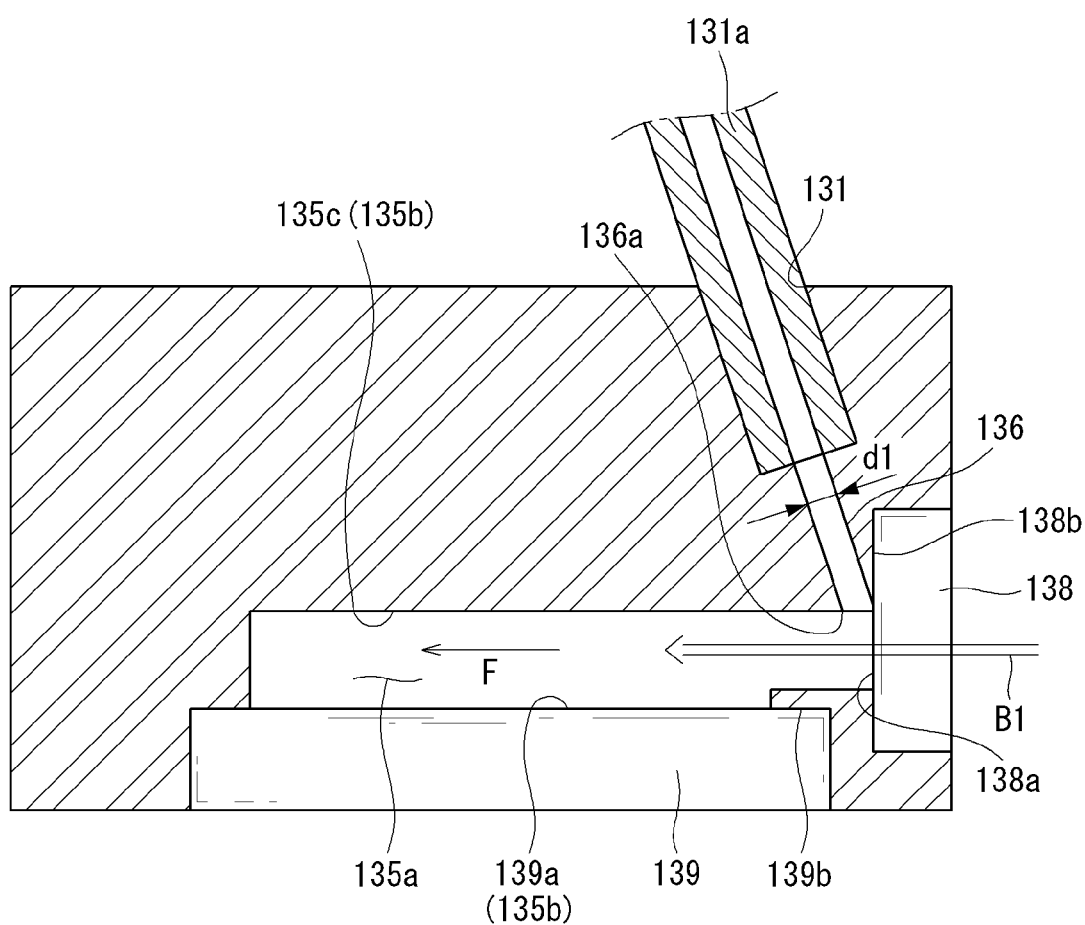
FIG. 10 is a cross-sectional view taken along B-B' of FIG. 8.
Figure 11:
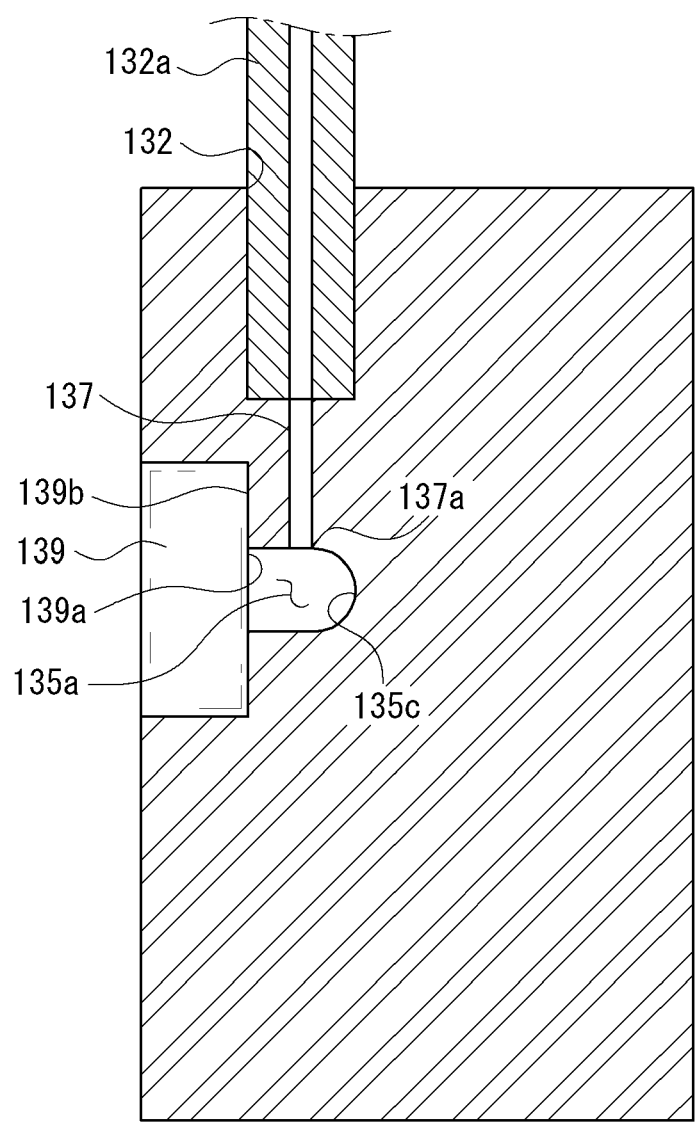
FIG. 11 is a cross-sectional view taken along C-C' of FIG. 8.
Figure 12:
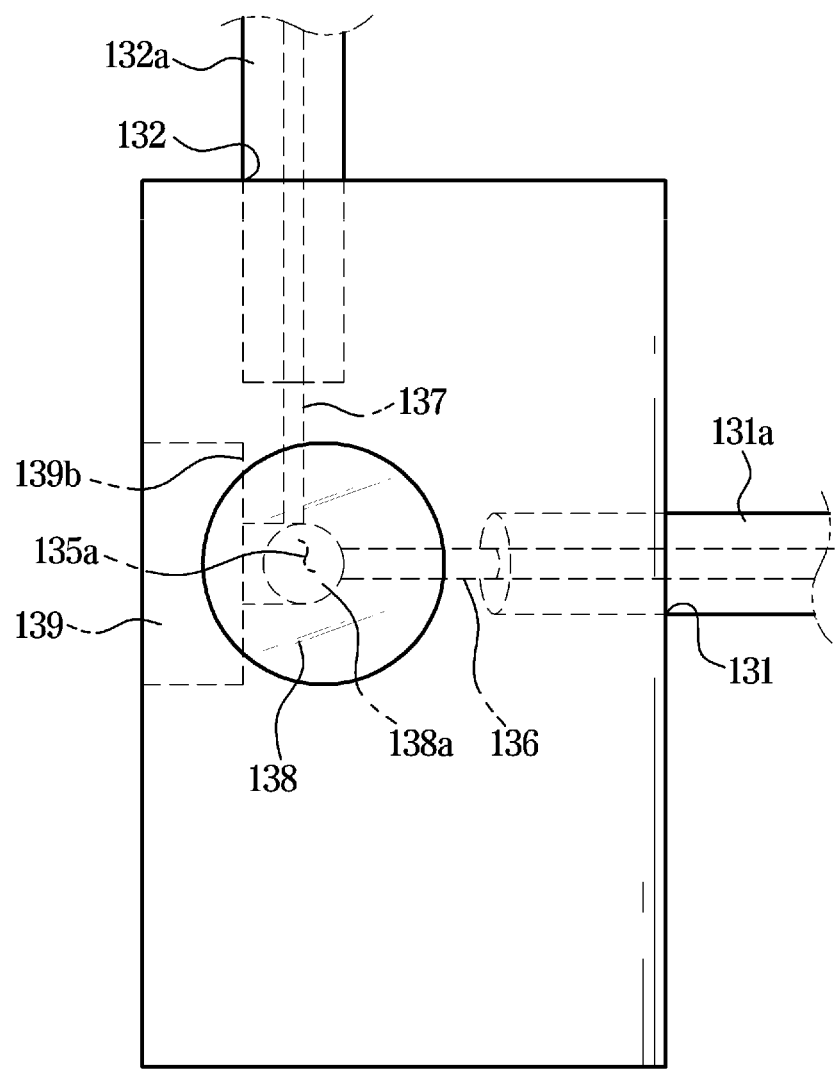
FIG. 12 illustrates a flow cell of FIG. 8 when viewed from the side.

FIG. 8 is a perspective view of a flow cell according to an embodiment of the present disclosure. FIG. 9 is a cross-sectional view taken along A-A' of FIG. 8. FIG. 10 is a cross-sectional view taken along B-B' of FIG. 8. FIG. 11 is a cross-sectional view taken along C-C' of FIG. 8. FIG. 12 illustrates a flow cell of FIG. 8 when viewed from the side.

Referring to FIGS. 1 to 12, the flow device 20 may include a flow cell 130. A reference numeral "d1" illustrated in FIG. 10 denotes a diameter or an inner diameter of an inlet guide portion 136 and is different from the reference numeral "d1" illustrated in FIG. 7. Further, a reference numeral "d2" illustrated in FIG. 9 denotes a diameter or an inner diameter of an outlet guide portion 137 and is different from the reference numeral "d2" illustrated in FIG. 7.

The flow cell 130 may be configured to flow the liquid sample in the flow cell 130. The flow cell 130 may include a cell inlet 131 into which the liquid sample is introduced, and a cell outlet 132 from which the liquid sample is discharged. The flow cell 130 may be formed of a material containing a quartz. For example, the flow cell 130 may be formed of a material including a polymer material such as acrylic.

Tubes 131a and 132a may be respectively connected to the cell inlet 131 and the cell outlet 132, and the cell inlet 131 and the cell outlet 132 may be connected to the outside of the flow cell 130 through the tubes 131a and 132a. The tubes 131a and 132a may be one configuration of the flow cell 130. For example, the first tube 131a may be connected to the cell inlet 131. For example, the second tube 132a may be connected to the cell outlet 132. The first tube 131a may be referred to as an "inlet tube", and the second tube 132a may be referred to as an "outlet tube".

The flow cell 130 may entirely have a hexahedral shape. Although the shape of the flow cell 130 has been illustrated and described as having a rectangular outer shape (front surface or side surface), the shape is not limited thereto. That is, the shape of the flow cell 130 and the arrangement of the detector 60 according to the shape of the flow cell 130 are not limited. This may be satisfied if the liquid sample is configured to flow inside the flow cell 130, and at least a part of the flow cell 130 is formed of a light transmission material so that the first laser beam B1 is irradiated to the liquid sample positioned inside the flow cell 130.

The flow cell 130 may include a flow portion 134 in which the liquid sample flows. The flow portion 134 in FIGS. 2, 3A and 3B above has been illustrated and described as having a "⌐" shape. In this embodiment, the flow portion 134 may be formed in an approximately "⊏" shape. The flow portion 134 may be connected to the inlet portion 41 (see FIG. 1) and the outlet portion 42. However, the shape of the flow portion 134 is not limited. For example, this may be satisfied if the liquid sample flows so that it is introduced from the outside of the flow cell 130, passes the inside of the flow cell 130, and is discharged to the outside of the flow cell 130.

The flow portion 134 may include a main flow portion 135, the inlet guide portion 136, and the outlet guide portion 137. The liquid sample may sequentially flow through the inlet guide portion 136, the main flow portion 135, and the outlet guide portion 137. For example, the main flow portion 135 may form a shape extending from one end to other end thereof. The inlet guide portion 136 may be formed to extend from the one end of the main flow portion 135. The inlet guide portion 136 may communicate with the cell inlet 131. For example, the outlet guide portion 137 may be formed to extend from other end of the main flow portion 135. The outlet guide portion 137 may communicate with the cell outlet 132.

The main flow portion 135 may form a flow space 135a in which the liquid sample containing nanoparticles flows. The main flow portion 135 may be configured such that the first laser beam B1 is irradiated to the flow space 135a. The flow space 135a of the main flow portion 135 may form a flow path through which the liquid sample flows in one direction. For example, the flow space 135a may have a shape extending from one end to other end of the main flow portion 135.

The inlet guide portion 136 may guide the liquid sample from the cell inlet 131 to the main flow portion 135. The outlet guide portion 137 may guide the liquid sample from the main flow portion 135 to the outside of the flow cell 130.

The inlet guide portion 136 and the outlet guide portion 137 may extend from the cell inlet 131 and the cell outlet 132, respectively. For example, the inlet guide portion 136 may extend from the cell inlet 131 and may be connected to one end of the main flow portion 135. For example, the outlet guide portion 137 may extend from the cell outlet 132 and may be connected to the other end of the main flow portion 135.

The inlet guide portion 136 may guide the liquid sample introduced into the flow cell 130 through the cell inlet 131 to the main flow portion 135. The outlet guide portion 137 may guide the liquid sample in the main flow portion 135 to the cell outlet 132.

The main flow portion 135 may be positioned within a predetermined depth from an outer surface of the flow cell 130. FIG. 8 illustrates that the inlet guide portion 136 and the outlet guide portion 137 are respectively connected to the tubes 131a and 132a within a predetermined depth from the outer surface of the flow cell 130, by way of example, but the present disclosure is not limited thereto. The inlet guide portion 136 and the outlet guide portion 137 may respectively extend to the cell inlet 131 and the cell outlet 132 of the flow cell 130, and may also extend to the outside of the flow cell 130.

The main flow portion 135 may be connected to the inlet guide portion 136 and the outlet guide portion 137. The inlet guide portion 136 and the outlet guide portion 137 may be connected to the main flow portion 135 in a different direction from a direction in which the liquid sample flows in the main flow portion 135.

That is, the main flow portion 135 may be bent from the inlet guide portion 136 and the outlet guide portion 137 at a predetermined angle. In other words, the main flow portion 135 may be disposed in a different direction from an arrangement direction of the inlet guide portion 136 and the outlet guide portion 137. For example, a flow direction F of the liquid sample flowing in the main flow portion 135 may be different from a direction in which the liquid sample flows in the inlet guide portion 136. For example, the flow direction F of the liquid sample flowing in the main flow portion 135 may be different from a direction in which the liquid sample flows in the outlet guide portion 137. For example, the direction in which the liquid sample flows in the inlet guide portion 136 may be different from the direction in which the liquid sample flows in the outlet guide portion 137. For example, the direction in which the liquid sample flows in the inlet guide portion 136 may form an angle with the direction in which the liquid sample flows in the outlet guide portion 137.

The flow direction F of the liquid sample in the main flow portion 135 may be parallel to a longitudinal direction of the main flow portion 135. The direction in which the liquid sample flows in the inlet guide portion 136 may be parallel to a longitudinal direction of the inlet guide portion 136. The direction in which the liquid sample flows in the outlet guide portion 137 may be parallel to a longitudinal direction of the outlet guide portion 137.

The longitudinal direction of the main flow portion 135 and the longitudinal direction of the inlet guide portion 136 may form an angle. For example, the longitudinal direction of the main flow portion 135 and the longitudinal direction of the inlet guide portion 136 may form a perpendicular angle.

The longitudinal direction of the main flow portion 135 and the longitudinal direction of the outlet guide portion 137 may form an angle. For example, the longitudinal direction of the main flow portion 135 and the longitudinal direction of the outlet guide portion 137 may form a perpendicular angle.

The longitudinal direction of the inlet guide portion 136 may not be parallel to the longitudinal direction of the outlet guide portion 137.

Through this configuration, when the first laser beam B1 is irradiated to the liquid sample flowing through the main flow portion 135, the liquid sample flowing through the inlet guide portion 136 and the outlet guide portion 137 may not respond to the first laser beam B1. Hence, the present disclosure can improve the measurement accuracy of nanoparticles in the liquid sample.

The flow cell 130 may include a transmission portion 138 transmitting the first laser beam B1. The transmission portion 138 may be configured to transmit the first laser beam B1.

At least a part of the transmission portion 138 may include a light transmission material so that the incident first laser beam B1 reaches the main flow portion 135. For example, the transmission portion 138 may include a quartz material.

The flow cell 130 may include an arrangement groove 138b in which the transmission portion 138 is disposed. The arrangement groove 138b may be concavely formed at one side of the flow cell 130. The transmission portion 138 may be seated and fixed to the arrangement groove 138b. A thickness of the transmission portion 138 is not limited, and this may be satisfied if one side of the flow space 135a of the main flow portion 135 is sealed and can transmit light.

The transmission portion 138 may be disposed at an upstream end of the main flow portion 135. For example, the transmission portion 138 may face one end of the main flow portion 135. For example, the transmission portion 138 may be positioned at a location where the main flow portion 135 and the inlet guide portion 136 meet. For another example, the transmission portion 138 may be positioned at a location where the main flow portion 135 and the outlet guide portion 137 meet.

The transmission portion 138 and the main flow portion 135 may be positioned to be parallel to each other. For example, the transmission portion 138 and the main flow portion 135 may be disposed in the longitudinal direction of the main flow portion 135. For example, a direction from the transmission portion 138 toward the main flow portion 135 may be parallel to the longitudinal direction of the main flow portion 135.

The transmission portion 138 may include a transmission surface 138a facing the main flow portion 135. The transmission surface 138a may be exposed to the flow space 135a. The transmission surface 138a may form a part of the flow path of the main flow portion 135. That is, the transmission surface 138a may form an upstream end surface of the flow path through which the liquid sample flows. In other words, the transmission surface 138a may form one end of the main flow portion 135. For example, the transmission surface 138a may be positioned at one end of the main flow portion 135. For another example, the transmission surface 138a may be positioned at other end of the main flow portion 135. Referring to FIGS. 10 and 12, the transmission surface 138a may be positioned behind a window 139. For example, the transmission surface 138a may be positioned behind an observation surface 139a.

The first laser beam B1 may travel in the same direction as the flow direction F of the liquid sample, pass through the transmission surface 138a, and be irradiated to the main flow portion 135. Although this embodiment has been illustrated and described that the first laser beam B1 is disposed at one end of the upstream side of the main flow portion 135, it is not limited thereto. For example, the flow direction of the main flow portion 135 and the irradiation direction of the first laser beam B1 may be arranged to be perpendicular. The transmission portion 138 may be disposed on the side of the main flow portion 135 to correspond to the irradiation direction of the pulsed laser beam. For another example, the transmission portion 138 may be disposed at other end of the downstream side of the main flow portion 135, and the first laser beam B1 may be irradiated in a direction opposite to the flow direction F of the liquid sample.

As another example, the irradiation direction of the first laser beam B1 may be adjusted to form a predetermined angle (between 0° and 90°) with respect to the flow direction F of the liquid sample. An angle formed by the flow direction F and the irradiation direction of the first laser beam B1 may be adjusted differently depending on the type of the detector.

The main flow portion 135 may include a flow path forming surface 135b that is connected to the transmission surface 138a and is formed in the flow direction F of the liquid sample as a longitudinal direction so as to form a flow path of the liquid sample.

The inlet guide portion 136 may include an inlet hole 136a positioned at one end of the main flow portion 135. The main flow portion 135 may be connected to the inlet guide portion 136 through the inlet hole 136a. The outlet guide portion 137 may include an outlet hole 137a positioned at the other end of the main flow portion 135. The main flow portion 135 may be connected to the outlet guide portion 137 through the outlet hole 137a.

The inlet guide portion 136 and the outlet guide portion 137 may be connected to the flow path forming surface 135b so as not to interfere with the first laser beam B1 irradiated in the flow direction F of the liquid sample. For example, the inlet hole 136a and the outlet hole 137a may be disposed in the flow path forming surface 135b. For example, the inlet guide portion 136 and the outlet guide portion 137 may be positioned out of the path of the first laser beam B1.

The inlet guide portion 136 and the outlet guide portion 137 may be configured not to be parallel to each other. That is, the inlet guide portion 136 and the outlet guide portion 137 may be connected to the flow path forming surface 135b in different directions in consideration of the flow of the liquid sample in the main flow portion 135.

The inlet guide portion 136 and the outlet guide portion 137 are respectively connected to one end of the upstream side and other end of the downstream side of the flow path forming surface 135b, and may be connected to the flow path forming surface 135b while being spaced apart from each other in a circumferential direction as illustrated in FIGS. 8 and 12. For example, the outlet guide portion 137 may extend upward from the main flow portion 135, and the inlet guide portion 136 may extend horizontally from the main flow portion 135.

The present disclosure can minimize the generation of bubbles by minimizing an eddy in the liquid sample that sequentially flows through the inlet guide portion 136, the main flow portion 135, and the outlet guide portion 137 through this configuration.

The flow cell 130 may include the window 139. The window 139 may be disposed along the flow path forming surface 135b. The window 139 may form a portion of the flow path forming surface 135b. The window 139 may face the main flow portion 135. The window 139 and the main flow portion 135 may be arranged in parallel with each other.

The window 139 may be positioned at a front face of the flow cell 130. For example, the window 139 may form at least a part of the front face of the flow cell 130. The inlet guide portion 136 and the outlet guide portion 137 may be positioned behind the front face of the flow cell 130.

The window 139 may be positioned behind the detector 60. In other words, the detector 60 may be positioned in front of the window 139. When plasma is generated in the main flow portion 135 by the first laser beam B1, the detector 60 may detect the plasma. For example, when plasma is generated in the main flow portion 135 by the first laser beam B1, scintillations or shock waves from the plasma may pass through the window 139 and travel toward the detector 60, and the detector 60 may detect the scintillations or the shock waves. For example, at least a part of light incident on the window 139 may pass through the window 139.

A direction in which the window 139 and the main flow portion 135 are disposed may be different from a direction in which the main flow portion 135 and the transmission portion 138 are disposed. For example, the direction in which the window 139 and the main flow portion 135 are disposed may form an angle with the direction in which the main flow portion 135 and the transmission portion 138 are disposed. For example, the direction in which the window 139 and the main flow portion 135 are disposed may be perpendicular to the direction in which the main flow portion 135 and the transmission portion 138 are disposed. For example, a direction from the window 139 toward the main flow portion 135 may form an angle with a direction in which the first laser beam B1 travels. For example, the direction from the window 139 toward the main flow portion 135 may be perpendicular to the direction in which the first laser beam B1 travels.

The detector 60 may be configured to detect a shock wave or a scintillation lamp through the window 139. At least a part of the window 139 may be formed of a light transmission material. For example, the window 139 may include a quartz material.

The flow cell 130 may include a window arrangement groove 139*b* in which the window 139 is disposed. The window arrangement groove 139*b* may be concavely formed in the side surface of the flow cell 130. The window 139 may be seated and fixed to the window arrangement groove 139*b*. A thickness of the window 139 is not limited, and this may be satisfied if the side surface of the flow space 135*a* of the main flow portion 135 is sealed through the observation surface 139*a* to be described later and can transmit light.

The window 139 and the transmission portion 138 may be disposed to be spaced apart from each other at a predetermined angle based on the main flow portion 135. For example, a direction in which the main flow portion 135 and the window 139 are disposed may be perpendicular to a direction in which the transmission portion 138 and the main flow portion 135 are disposed.

Through this, the present disclosure can minimize interference that the first laser beam B1 applies to the plasma light or shock wave exposed through the window 139, and can improve the detection efficiency.

An angle formed by the arrangement direction of the main flow portion 135 and the window 139 and the arrangement direction of the main flow portion 135 and the transmission portion 138 is not limited to a vertical angle. This may be satisfied, if the angle is set so that a direction in which the first laser beam B1 is incident does not coincide with a direction in which the plasma light or the shock wave is exposed through the window 139.

The window 139 may include the observation surface 139*a*. The observation surface 139*a* may form at least a part of the flow path forming surface 135*b*. For example, the observation surface 139*a* may form a boundary between the main flow portion 135 and the window 139.

The observation surface 139*a* may be exposed to the flow space 135*a* of the main flow portion 135 by forming at least a part of the flow path forming surface 135*b*. In addition, the observation surface 139*a* may seal the side of the flow space 135*a* by forming at least a part of the flow path forming surface 135*b*. The window 139 may be formed to elongate the flow direction F of the liquid sample along the flow path forming surface 135*b* in the longitudinal direction. For example, the window 139 may be formed to extend in the flow direction F of the liquid sample.

The window 139 may be positioned in front of the main flow portion 135. The inlet guide portion 136 and the outlet guide portion 137 may be positioned behind the window 139. The outlet guide portion 137 may be formed to extend upward from the main flow portion 135. For example, the outlet guide portion 137 may be formed to extend upward from the flow path forming surface 135*b*. The inlet guide portion 136 may be formed to extend rearward from the main flow portion 135. For example, the inlet guide portion 136 may be formed to extend rearward from the flow path forming surface 135*b*.

The flow path forming surface 135*b* may include the observation surface 139*a* and an inner surface 135*c* (refer to FIGS. 10 and 11). The inner surface 135*c* may be a surface facing the observation surface 139*a*. The inner surface 135*c* may be formed to extend in the flow direction F of the liquid sample. The inner surface 135*c* may be formed as a curved surface extending the flow direction F of the liquid sample in the longitudinal direction. The inner surface 135*c* may be positioned behind the observation surface 139*a*. The inner surface 135*c* may have a curved surface. For example, the inner surface 135*c* may be formed by recessing rearward the main flow portion 135. For example, the inner surface 135*c* may have a concave shape when viewed from the observation surface 139*a*.

A cross section of the flow path forming surface 135*b* based on the longitudinal direction of the main flow portion 135 may be formed in at least one of a circular shape or a polygon shape. For example, a cross section of the observation surface 139*a* may be a straight line. For example, the observation surface 139*a* may be a flat surface. A cross section of the inner surface 135*c* may be a curved line. For example, the inner surface 135*c* may be a curved surface.

When the direction in which the main flow portion 135 extends is referred to as an axial direction, a cross section of the inner surface 135*c* with respect to the axial direction of the main flow portion 135 may be a curved line. For example, a cross section of the inner surface 135*c* with respect to the axial direction of the main flow portion 135 may have a paraboloid shape. Hence, the scintillation or shock wave generated inside the main flow portion 135 may easily travel toward the window 139.

However, the cross-sectional shape of the flow path forming surface 135*b* is not limited thereto. This may be satisfied, if it is configured such that the generation of bubbles in the liquid sample flowing through the main flow portion 135 is minimized, and the plasma information collected by the detector is not distorted.

A size of an inner diameter of the main flow portion 135 may be uniformly formed throughout the entire main flow portion 135, and the main flow portion 135 may be configured to vary the size of the inner diameter in the flow direction F of the liquid sample. More specifically, the main flow portion 135 may be divided into a plurality of sections and configured to have a different inner diameter for each section. The size and shape of the inner diameter of the main flow portion 135 are not limited.

A size of an inner diameter of the inlet guide portion 136 may be greater than a size of an inner diameter of the outlet guide portion 137. Hence, a discharge pressure in the outlet guide portion 137 may be greater than an introduction pressure in the inlet guide portion 136.

Through this, a volume occupied by the liquid sample flowing in the flow space 135*a* can be maximized, and eddy generation and bubble generation of the liquid sample can be minimized.

A ratio of a size d1 of the inner diameter of the inlet guide portion 136 to a size d2 of the inner diameter of the outlet guide 137 may be 1 to 2:1. For example, the size d1 of the inner diameter of the inlet guide portion 136 may be about 1.5 times greater than the size d2 of the inner diameter of the outlet guide 137. For example, the ratio of the size d1 of the inner diameter of the inlet guide portion 136 to the size d2 of the inner diameter of the outlet guide 137 may be 3:2.

For example, a size of an inner diameter of the inlet tube 131*a* may be greater than a size of an inner diameter of the outlet tube 132*a*. The above configurations can be variously changed, and this may be satisfied if an introduction pressure at the inlet side of the main flow portion 135 is greater than a discharge pressure at the outlet side of the main flow portion 135.

In the flow device 20, the inlet portion 41 and the outlet portion 42 may be connected to one reservoir in which the liquid sample is stored, and the liquid sample discharged from the reservoir to the inlet portion 41 may be introduced into the reservoir through the outlet portion 42.

However, the present disclosure is not limited thereto, and the inlet portion 41 and the outlet portion 42 may be connected to independent reservoirs, respectively. So far, specific embodiments have been illustrated and described.

Referring to FIGS. 5 to 12, the step S110 of irradiating the pulsed laser beam may include a step of flowing the liquid sample into the main flow portion 135 through the inlet guide portion 136. In the step S110, after the liquid sample flows in the main flow portion 135, the first laser beam B1 may be irradiated to the main flow portion 135. The step of flowing the liquid sample may be a step in which the flow controller 50 operates so that the flow state and the flow stop state of the liquid sample are alternately repeated.

The step S120 of obtaining the detection signal may be performed in front of the window 139. For example, in the step S120, the detector 60 positioned in front of the window 139 may detect plasma.

Although the embodiments have been described with reference to a number of illustrative embodiments thereof, numerous other modifications and embodiments may be devised by those skilled in the art that will fall within the scope of the principles of the present disclosure. In particular, various variations and modifications are possible in the component parts and/or arrangements of the subject combination arrangement within the scope of the present disclosure, the drawings and the appended claims. In addition to variations and modifications in the component parts and/or arrangements, alternative uses will also be apparent to those skilled in the art. The scope of the present disclosure should be determined by rational interpretation of the appended claims, and all modifications within an equivalent scope of the present disclosure are included in the scope of the present disclosure.

What is claimed is:

1. A flow cell comprising:
    a main flow portion formed to extend from one end in one direction and lead to other end, a pulsed laser beam being irradiated to the main flow portion, the main flow portion including a flow space in which a liquid sample flows;
    an inlet guide portion connected to the main flow portion in a different direction from the one direction and configured to guide an introduction of the liquid sample into the main flow portion; and
    an outlet guide portion connected to the main flow portion in a different direction from the one direction and configured to guide a discharge of the liquid sample from the main flow portion,
    wherein a cell outlet is disposed on an upper surface of the flow cell, and the outlet guide portion is disposed between the cell outlet and the main flow portion, and
    a cell inlet is disposed on a rear surface of the flow cell, and the inlet guide portion is disposed between the cell inlet and the main flow portion.

2. The flow cell of claim 1, further comprising:
    a transmission portion having a transmission surface exposed to the flow space,
    wherein the pulsed laser beam passes through the transmission surface and travels toward the flow space.

3. The flow cell of claim 2, wherein the transmission portion is positioned at the one end or the other end of the main flow portion; and
    the pulsed laser beam travels in the one direction, passes through the transmission surface, and is irradiated to the main flow portion.

4. The flow cell of claim 2, wherein the main flow portion comprises a flow path forming surface that is connected to the transmission surface, extends in the one direction, and forms a flow path of the liquid sample, and
    wherein the inlet guide portion and the outlet guide portion are connected to the flow path forming surface and are positioned out of a path of the pulsed laser beam.

5. The flow cell of claim 4, wherein one end of the flow path forming surface is positioned at the one end of the main flow portion;
    the other end of the flow path forming surface is positioned at the other end of the main flow portion; and
    the inlet guide portion and the outlet guide portion are respectively connected to the one end and the other end of the flow path forming surface and are spaced apart from each other in a circumferential direction using the main flow portion as a shaft.

6. The flow cell of claim 4, wherein one end of the flow path forming surface is positioned at the one end of the main flow portion;
    the other end of the flow path forming surface is positioned at the other end of the main flow portion;
    the inlet guide portion extends from the one end of the flow path forming surface and is positioned behind a front face of the flow cell; and
    the outlet guide portion extends from the other end of the flow path forming surface and is positioned behind the front face of the flow cell.

7. The flow cell of claim 4, wherein the flow path forming surface comprises a curved surface extending in the one direction.

8. The flow cell of claim 4, further comprising:
    a window positioned in front of the main flow portion,
    wherein the window comprises an observation surface that forms at least a part of the flow path forming surface and is exposed to the flow space.

9. The flow cell of claim 8, wherein the flow path forming surface further comprises an inner surface that faces the observation surface and forms a curved shape recessed rearward from the main flow portion.

10. The flow cell of claim 8, wherein the transmission surface is positioned behind the window.

11. The flow cell of claim 1, wherein an inner diameter of the inlet guide portion is greater than or equal to an inner diameter of the outlet guide portion.

12. The flow cell of claim 11, wherein a ratio of the inner diameter of the inlet guide portion to the inner diameter of the outlet guide portion is 1 to 2:1.

13. The flow cell of claim 2, wherein the transmission portion comprises a quartz material.

* * * * *